United States Patent
George

(10) Patent No.: US 9,927,806 B2
(45) Date of Patent: Mar. 27, 2018

(54) ESTIMATION ALGORITHM FOR DISCRETE-TIME UNCERTAIN STOCHASTIC SYSTEMS AND DEVICE RELATING THERETO

(71) Applicant: U.S. Army Research Laboratory ATTN: RDRL-LOC-I, Adelphi, MD (US)

(72) Inventor: Jemin George, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1480 days.

(21) Appl. No.: 13/733,181

(22) Filed: Jan. 3, 2013

(65) Prior Publication Data

US 2014/0188774 A1    Jul. 3, 2014

(51) Int. Cl.
*G06N 7/08* (2006.01)
*G05B 23/02* (2006.01)

(52) U.S. Cl.
CPC .......... *G05B 23/0254* (2013.01); *G06N 7/08* (2013.01)

(58) Field of Classification Search
CPC .......... G06N 5/04; G06N 5/02; G06N 5/022; G06N 7/08; G06Q 50/01
USPC ........................................................ 706/46
See application file for complete search history.

(56) References Cited

U.S. PATENT DOCUMENTS

| | | | |
|---|---|---|---|
| 7,873,472 B2 | 1/2011 | Zeng et al. | |
| 2005/0027494 A1* | 2/2005 | Erdogmus | G05B 13/042 703/2 |
| 2013/0277287 A1* | 10/2013 | Moissl | A61M 1/16 210/96.2 |
| 2014/0074768 A1* | 3/2014 | Horwood | B64G 3/00 706/52 |

OTHER PUBLICATIONS

C. E. de Souza, M. Fu, and L. Xie., "H∞ estimation for discrete time linear uncertain systems," International Journal of Robust and Nonlinear Control, vol. 1, pp. 11-23, 1991.
L. Xie, C. E. de Souza, and M. D. Fragoso, "H∞ filtering for linear periodic systems with parameter uncertainty," Systems & Control Letters, vol. 17, pp. 343-350, 1991.
M. Fu, C. E. de Souza, and L. Xie, "H∞ estimation for uncertain systems," International Journal of Robust and Nonlinear Control, vol. 2, pp. 87-105, 1992.

(Continued)

*Primary Examiner* — Lut Wong
(74) *Attorney, Agent, or Firm* — Lawrence E. Anderson

(57) ABSTRACT

An apparatus and method for estimation of a system having state variables representing the state of the system comprising predicting the estimate of the state variables along with the uncertainties in the state variables; observing a measurement of at least one state variable corrupted with some amount of error; updating the estimates of the state variables using a weighted average, with more weight being given to estimates with higher certainty; and providing an estimator input to update the estimates of the state variables, the estimator input operating to provide asymptotic convergence of the mean estimation error in all of the state variables in the presence of persistent excitation or disturbance that is not asymptotically decaying to zero.

13 Claims, 16 Drawing Sheets

(56) References Cited

OTHER PUBLICATIONS

J. L. Crassidis and J. L. Junkins, Optimal Estimation of Dynamic System. Boca Raton, FL: CRC, 2004, pp. 1-702.

George, J., Adaptive Stochastic Disturbance Accommodating Control, International Journal of Control, Dec. 23, 2010. ISSN: 0020-7179 print/ISSN 1366-5820 online. lairs.eng.buffalo.edu/wiki/images/3/37/J17.pdf.

A. H. Sayed, "A framework for state-space estimation with uncertain models," Automatic Control, IEEE Transactions on, vol. 46, No. 7, pp. 998-1013, Jul. 2001.

K. Reif, S. Gunther, E. Yaz, and R. Unbehauen, "Stochastic stability of the discrete-time extended kalman filter," Automatic Control, IEEE Transactions on, vol. 44, No. 4, pp. 714-728, Apr. 1999.

S. Boyd, L. E. Ghaoui, E. Feron, and V. Balakrishnan, Linear Matrix Inequalities in System and Control Theory, ser. Studies in Applied Mathematics. Philadelphia, PA: SIAM, 1997, vol. 15.

K. Nagpal and P. Khargonekar, "Filtering and smoothing in an H∞ setting," Automatic Control, IEEE Transactions on, vol. 36, No. 2, pp. 152-166, Feb. 1991.

P. Gahinet, A. Nemirovski, A. J. Laub, and M. Chilali, "LMI Control Toolbox," The MathWorks, Inc., Natick, MA, Tech. Rep., 1995.

D. S. Bernstein, W. M. Haddad, and D. Mustafa, "Mixed-norm H2/H∞, regulation and estimation: The discrete-time case," Systems & Control Letters, vol. 16, pp. 235-248, 1991.

Z. Wang and H. Unbehauen, "Robust H2/H∞-state estimation for systems with error variance constraints: the continuous-time case," Automatic Control, IEEE Transactions on, vol. 44, No. 5, pp. 1061-1065, May 1999.

H. Xu and S. Mannor, "A Kalman filter design based on the performance/robustness tradeoff," Automatic Control, IEEE Transactions on, vol. 54, No. 5, pp. 1171-1175, May 2009.

A. Savkin and I. Petersen, "Recursive state estimation for uncertain systems with an integral quadratic constraint," Automatic Control, IEEE Transactions on, vol. 40, No. 6, pp. 1080-1083, Jun. 1995.

D. Bertsekas and I. Rhodes, "Recursive state estimation for a setmembership description of uncertainty," Automatic Control, IEEE Transactions on, vol. 16, No. 2, pp. 117-128, Apr. 1971.

M. James and I. Petersen, "Nonlinear state estimation for uncertain systems with an integral constraint," Signal Processing, IEEE Transactions on, vol. 46, No. 11, pp. 2926-2937, Nov. 1998.

I. R. Petersen and D. C. McFarlane, "Robust state estimation for uncertain systems," in Decision and Control, Proceedings of the 30th IEEE Conference on, vol. 3, Dec. 1991, pp. 2630-2631.

L. Xie, Y. C. Soh, and C. E. de Souza, "Robust Kalman filtering for uncertain discrete-time systems," Automatic Control, IEEE Transactions on, vol. 39, p. 13101314, Jun. 1994.

I. Petersen and D. McFarlane, "Optimal guaranteed cost control and filtering for uncertain linear systems," Automatic Control, IEEE Transactions on, vol. 39, No. 9, pp. 1971-1977, Sep. 1994.

U. Shaked, L. Xie, and Y. C. Soh, "New approaches to robust minimum variance filter design," Signal Processing, IEEE Transactions on, vol. 49, No. 11, pp. 2620-2629, Nov. 2001.

C. de Souza, K. Barbosa, and A. Trofino, "Robust filtering for linear systems with convex-bounded uncertain time-varying parameters," Automatic Control, IEEE Transactions on, vol. 52, No. 6, pp. 1132-1138, Jun. 2007.

A. Subramanian and A. Sayed, "Multiobjective filter design for uncertain stochastic time-delay systems," Automatic Control, IEEE Transactions on, vol. 49, No. 1, pp. 149-154, Jan. 2004.

Subramanian, A., "Regularized robust filters for time-varying uncertain discretetime systems," Automatic Control, IEEE Transactions on, vol. 49, No. 6, pp. 970-975, Jun. 2004.

G. De Nicolao and M. Gevers, "Difference and differential riccati equations: a note on the convergence to the strong solution," Automatic Control, IEEE Transactions on, vol. 37, No. 7, pp. 1055-1057, Jul. 1992.

P. Neveux, E. Blanco, and G. Thomas, "Robust filtering for linear timeinvariant continuous systems," Signal Processing, IEEE Transactions on, vol. 55, No. 10, pp. 4752-4757, Oct. 2007.

T. Zhou, "Sensitivity penalization based robust state estimation for uncertain linear systems," Automatic Control, IEEE Transactions on, vol. 55, No. 4, pp. 1018-1024, Apr. 2010.

M. Basin, A. Loukianov, and M. Hernandez-Gonzalez, "Optimal filtering for uncertain linear stochastic systems," in Decision and Control, Proceedings of the 48th IEEE Conference on, Dec. 2009, pp. 3376-3381.

M. Green and J. B. Moore, "Persistence of excitation in linear systems," Systems & Control Letters, vol. 7, No. 5, pp. 351-360, 1986.

A. H. Jazwinski, Stochastic Processes and Filtering Theory. Mineola, NY: Dover Publications, Inc., pp. 200 and 201, 1998.

\* cited by examiner

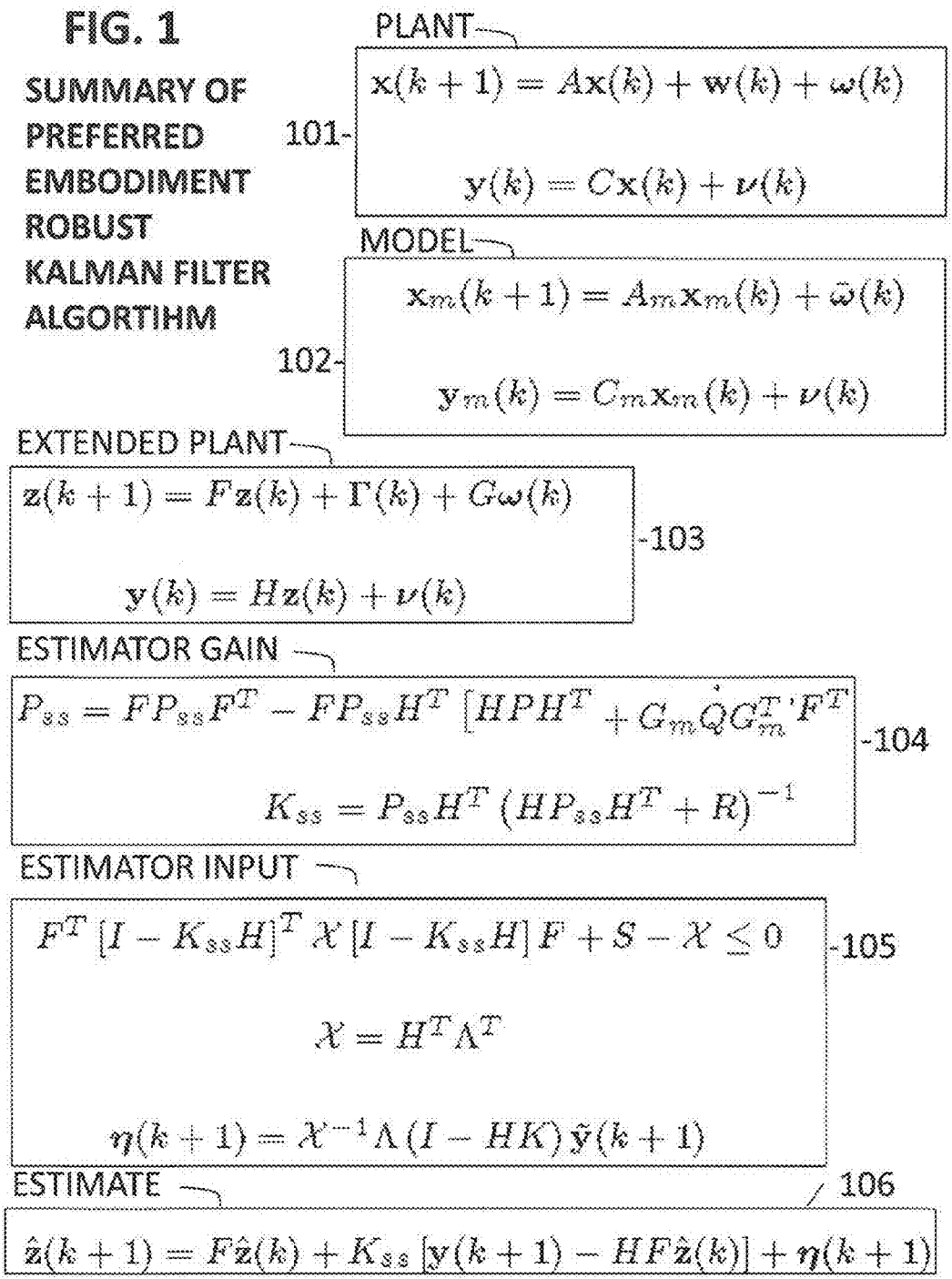

Target dynamics

$$x(k+1) = Ax(k) + w(k) + \omega(k)$$

$x(k)$: target state (n-dimensional vector)
  $w(k)$: unknown disturbance representing target maneuver
  $\omega(k)$: zero-mean Gaussian process noise with unknown covariance

201

Target model

$$x_m(k+1) = A_m x_m(k) + \bar{\omega}(k)$$

$\bar{\omega}(k)$: zero-mean Gaussian process noise with known covariance $Q$

202

Measurement process

$$y(k) = Cx(k) + \nu(k)$$

$y(k)$: measurements (m-dimensional vector)
  $\nu(k)$: zero-mean Gaussian measurement noise with known covariance $R$

203

Measurement model

$$y_m(k) = C_m x_m(k) + \nu(k)$$

204

Model-error vectors

$$m(k) = \{A - A_m\} x(k) + w(k),$$
$$n(k) = \{C - C_m\} x(k)$$

205

Extended dynamics

$$\begin{bmatrix} x(k+1) \\ n(k+1) \end{bmatrix} = \begin{bmatrix} A_m & 0 \\ 0 & -\frac{1}{2}I_{m\times m} \end{bmatrix} \begin{bmatrix} x(k) \\ n(k) \end{bmatrix} + \begin{bmatrix} m(k) \\ u(k) \end{bmatrix} + \begin{bmatrix} I_{n\times n} \\ \Delta C \end{bmatrix} \omega(k)$$

$\Delta C \triangleq \{C - C_m\}$
  $I_{n\times n} \triangleq$ an identity matrix of dimension $n \times n$
  $u(k) \triangleq \{C - C_m\} \{[A_m + \frac{1}{2}I_{n\times n}] x(k) + m(k)\}$

Extended target dynamics (matrix notation)

$$z(k+1) = Fz(k) + \Gamma(k) + Gw(k)$$

$$z(k) \triangleq [x^T(k) \quad u^T(k)]^T$$

$$F \triangleq \begin{bmatrix} A_m & 0 \\ 0 & -\frac{1}{\delta}I_{m \times m} \end{bmatrix}$$

$$\Gamma(k) \triangleq [m^T(k) \quad u^T(k)]^T$$

$$G \triangleq \begin{bmatrix} I_{n \times n} \\ \Delta C \end{bmatrix}$$

207

Extended measurement process (matrix notation)

$$y(k) = Hz(k) + \nu(k)$$

$$H \triangleq [C_m \quad I_{m \times m}]$$

-208

Extended target model

$$z_m(k+1) = Fz_m(k) + G_m\omega(k)$$

$$G_m \triangleq \begin{bmatrix} I_{n \times n} \\ 0_{m \times n} \end{bmatrix}$$

-209

Solve the algebraic matrix Riccati equation

$$P_{ss} = FP_{ss}F^T - FP_{ss}H^T[HPH^T + R]^{-1}HPF^T + G_mQG_m^T$$

-210

Calculate steady-state estimator gain

$$K_{sx} = P_{ss}H^T(HP_{ss}H^T + R)^{-1}$$

-211

Solve the following linear matrix inequality for $X$ and $\Lambda$ for any $S > 0$

$$\begin{bmatrix} \left( \begin{array}{c} F^T[I - K_{sx}H]^TX \\ \times [I - K_{sx}H]F + S - X \end{array} \right) & X - H^T\Lambda^T \\ X^T - \Lambda H & 0_{(n+m)\times(n+m)} \end{bmatrix} \leq 0$$

-212

Calculate estimator input

$$\eta(k+1) = X^{-1}\Lambda(I - HK)\bar{y}(k+1)$$

-213

Estimator (tracker)

$$\hat{z}(k+1) = F\hat{z}(k) + K_{sx}[y(k+1) - HF\hat{z}(k)] + \eta(k+1)$$

-214

Estimator error (tracking error) guarantee

$$\lim_{k \to \infty} \mathcal{E}\{z(k) - \hat{z}(k)\} = 0$$

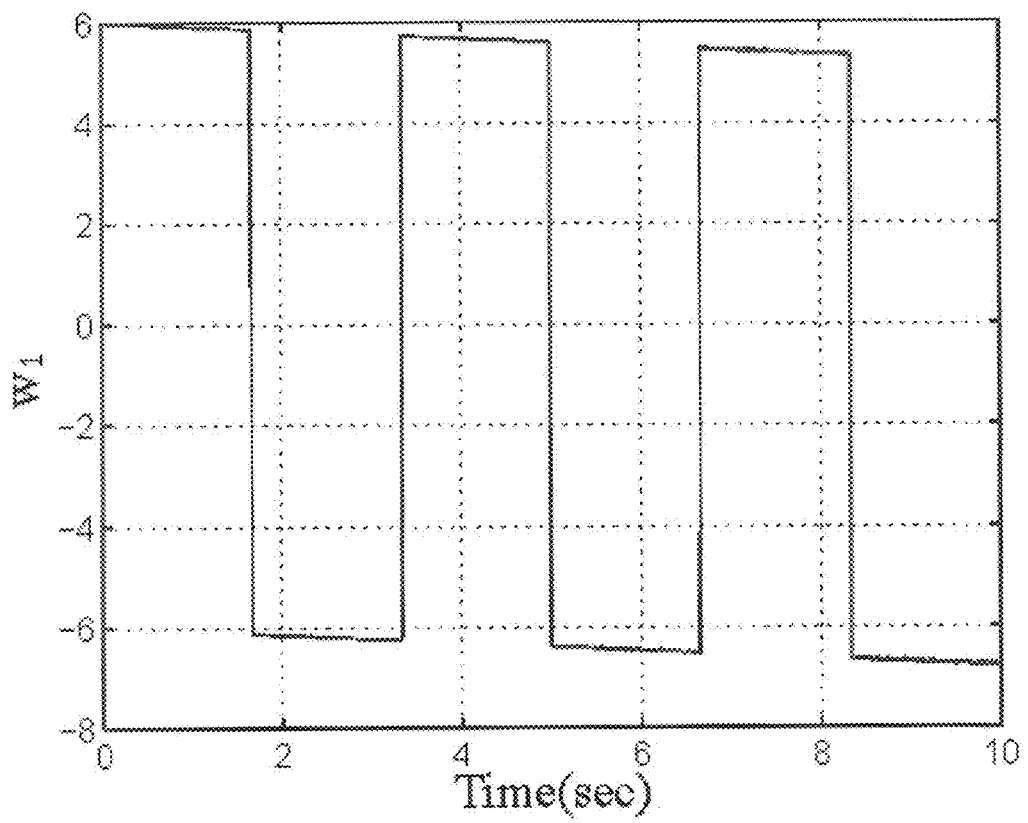
FIG. 3A  $w_1(k)$
Persistently Exciting Disturbances

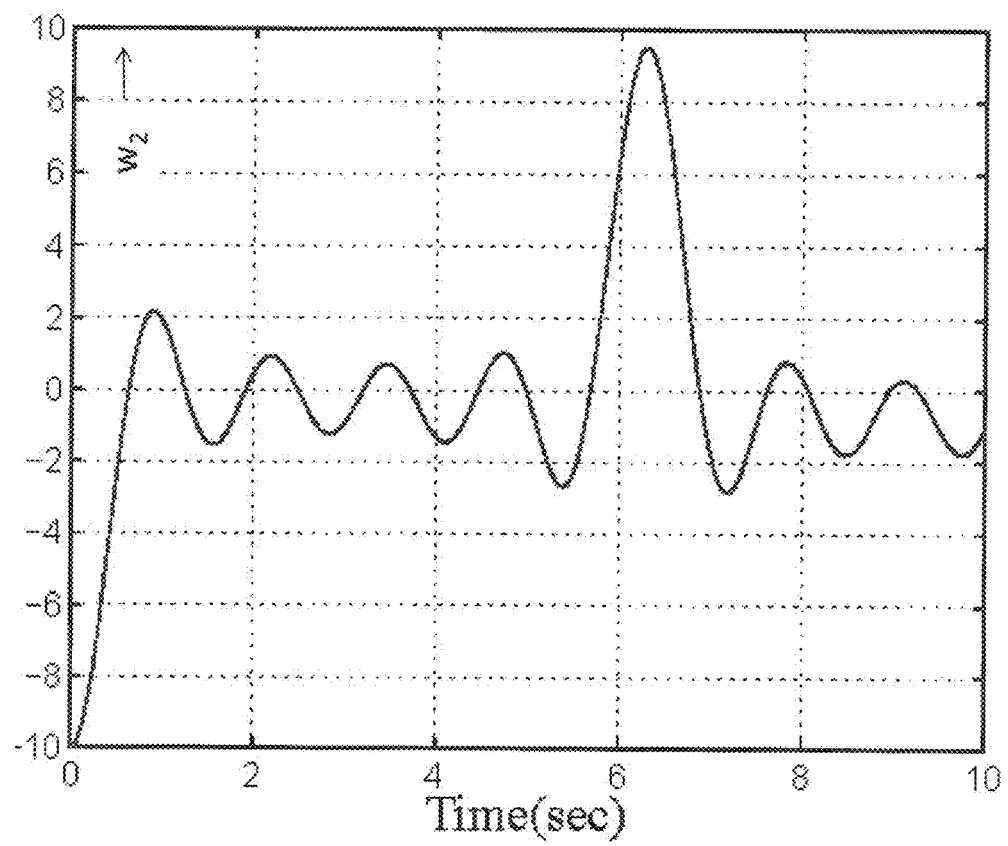
FIG. 3B  $w_2(k)$
Persistently Exciting Disturbances

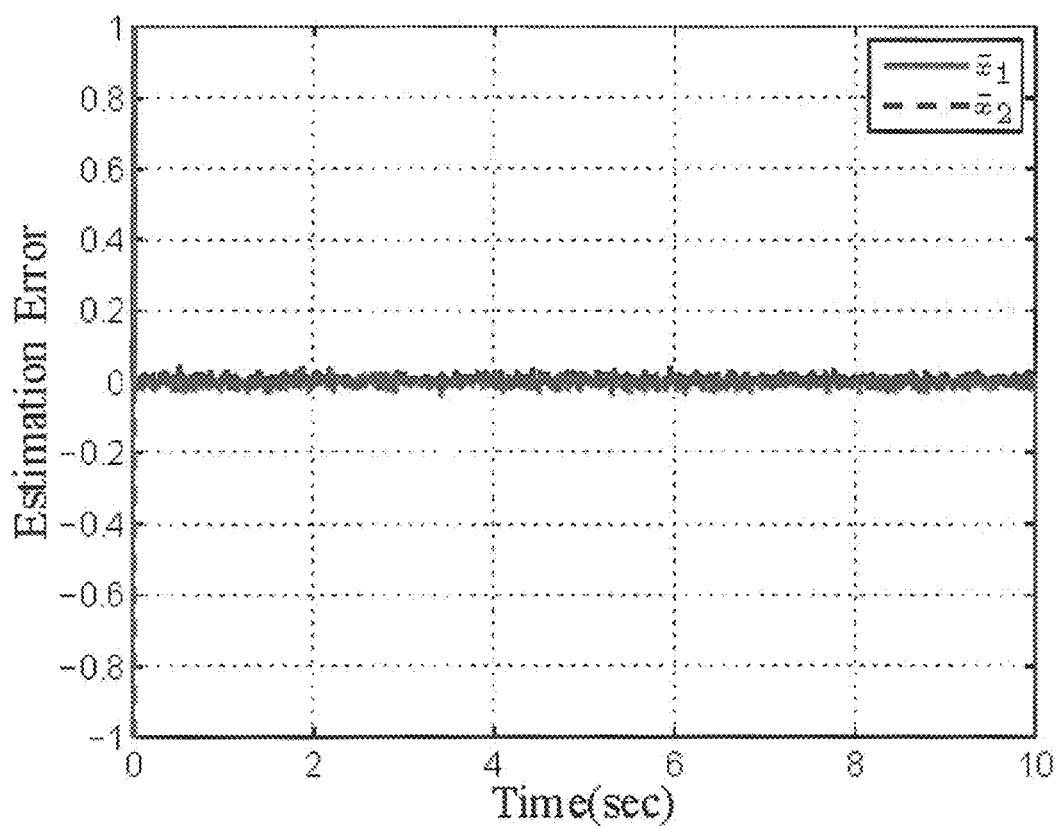
FIG. 4A KALMAN FILTER

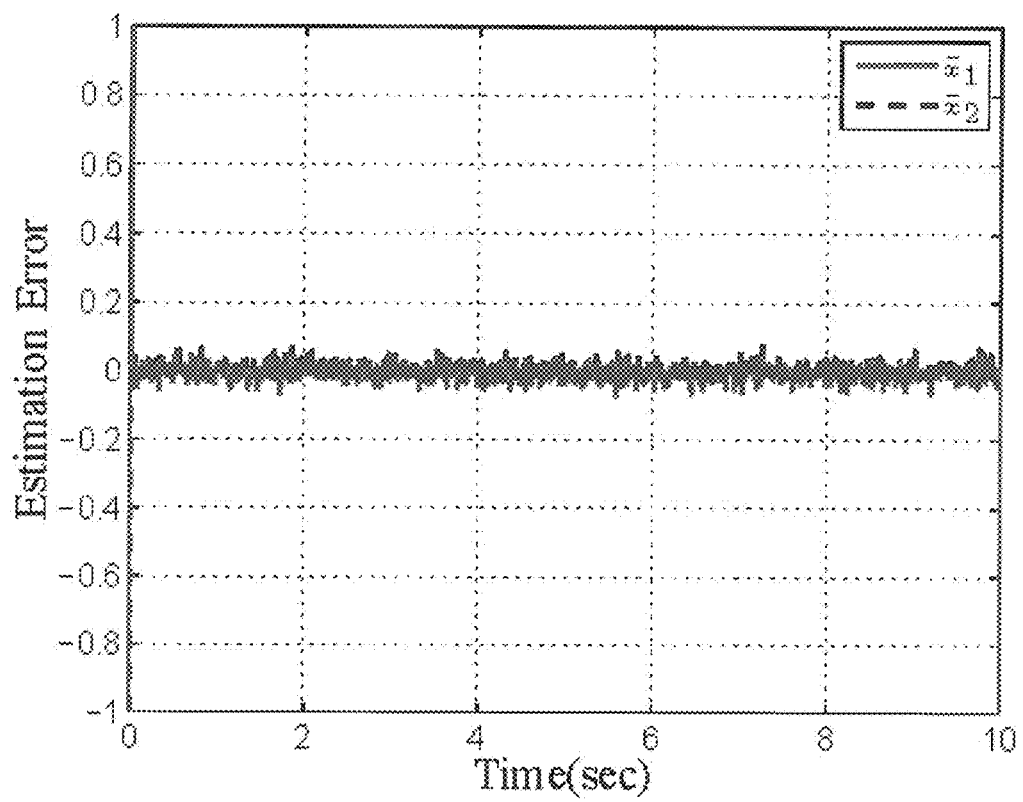
SIMULATION I: STATE ESTIMATION ERROR
FIG. 4B PREFERRED EMBODIMENT ROBUST KALMAN FILTER

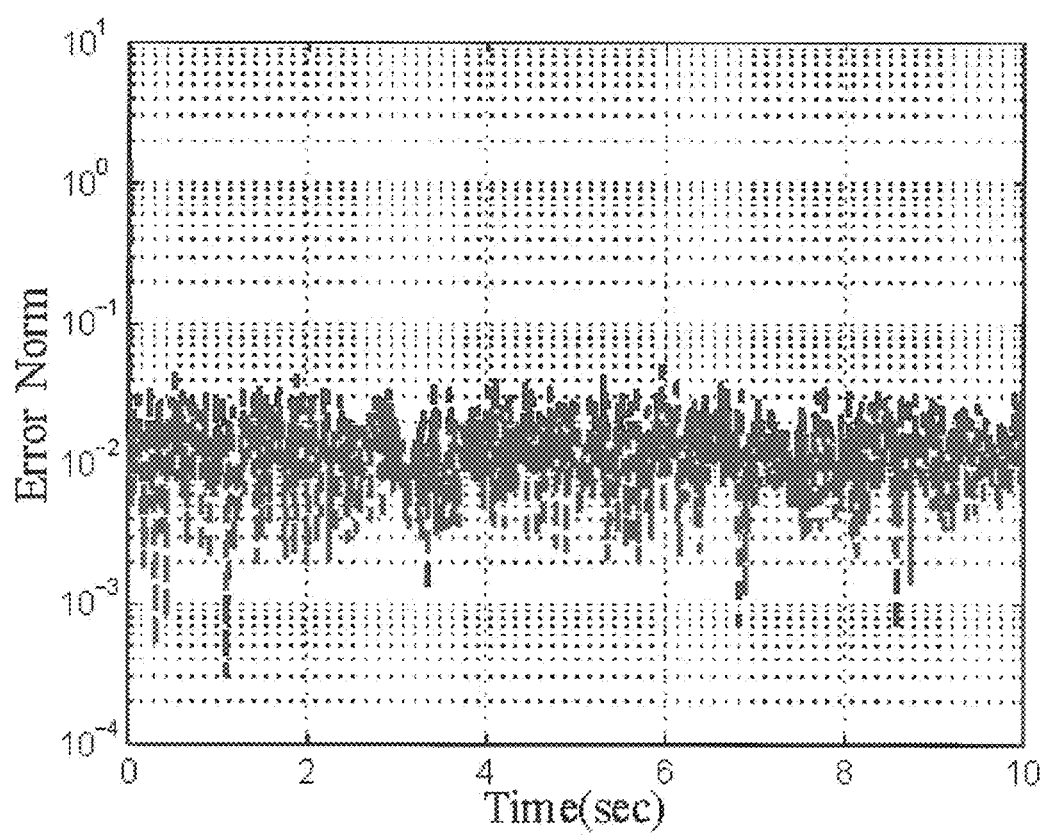
FIG.5A KALMAN FILTER

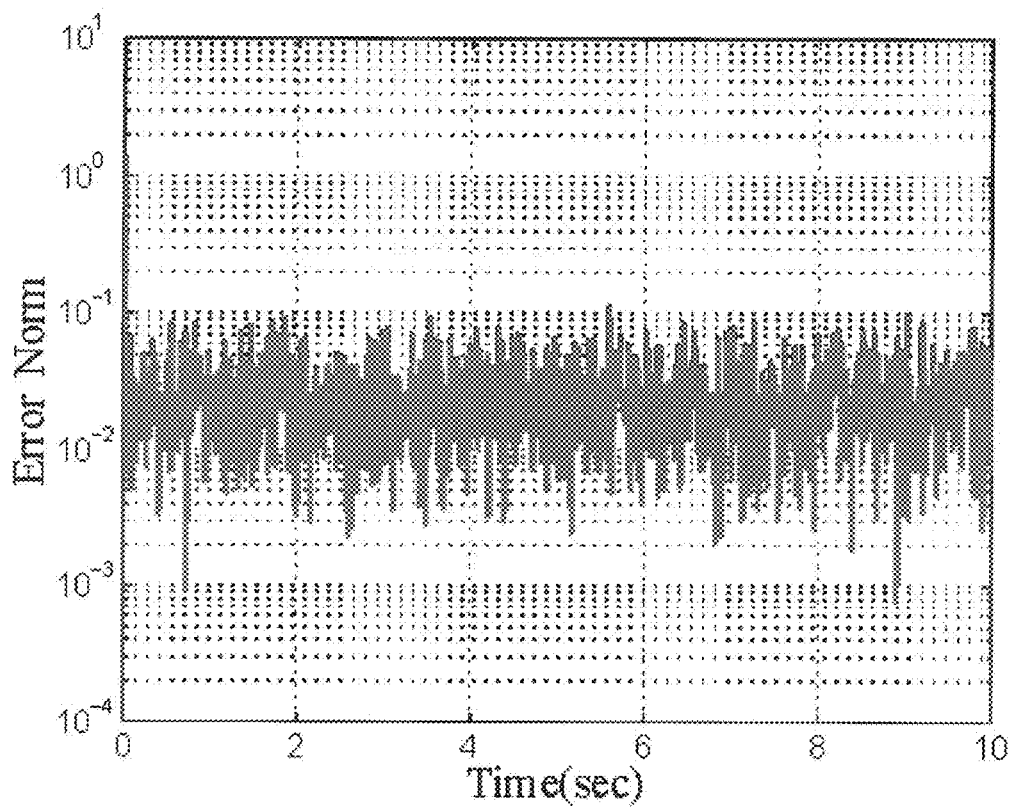
FIG. 5B PREFERRED EMBODIMENT ROBUST KALMAN FILTER
SIMULATION I: STATE ESTIMATION ERROR NORM

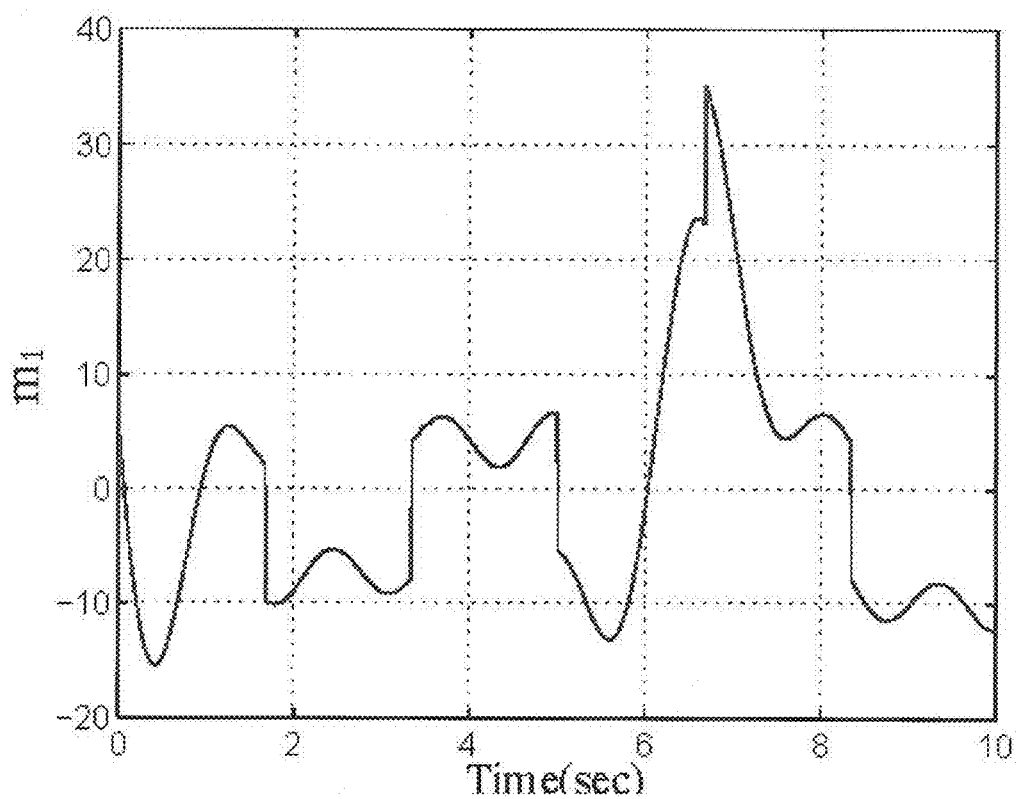
FIG.6A    $m_1(k)$
Simulation II: Model-Error Vector
$$\Gamma(k) = [m_1(k)\ m_2(k)\ u(k)]$$

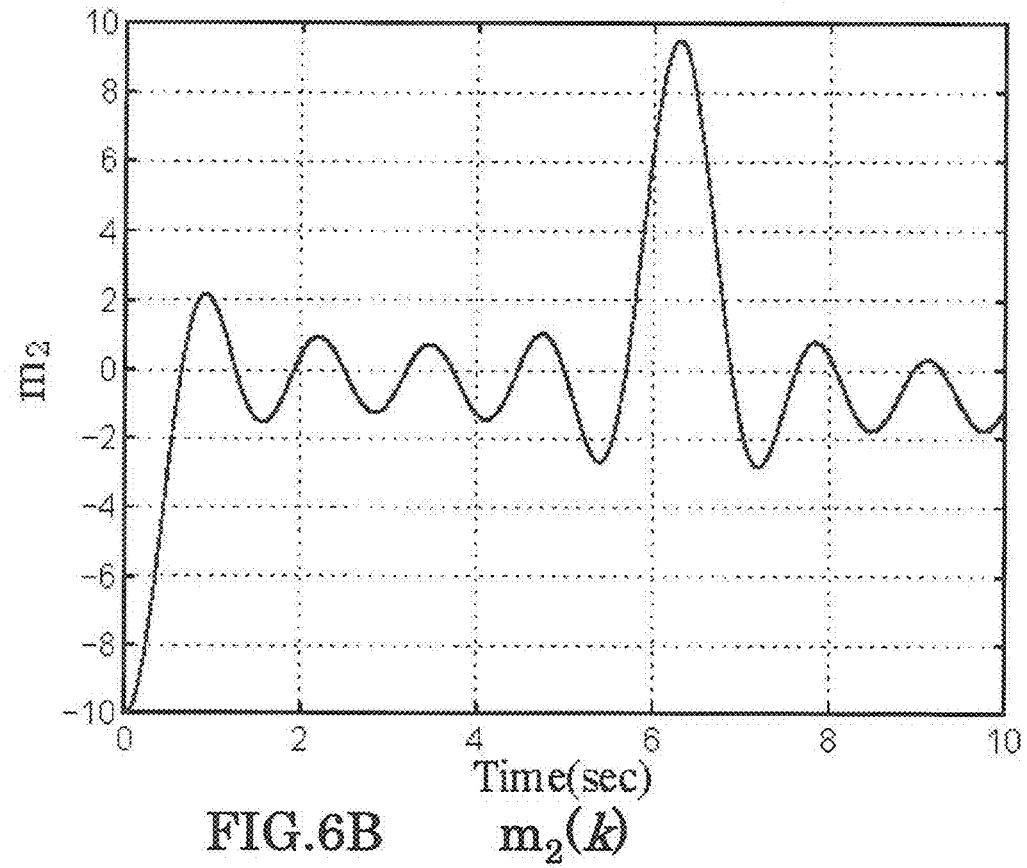
FIG.6B  $m_2(k)$
Simulation II: Model-Error Vector
$$\Gamma(k) = [m_1(k) \ m_2(k) \ u(k)]$$

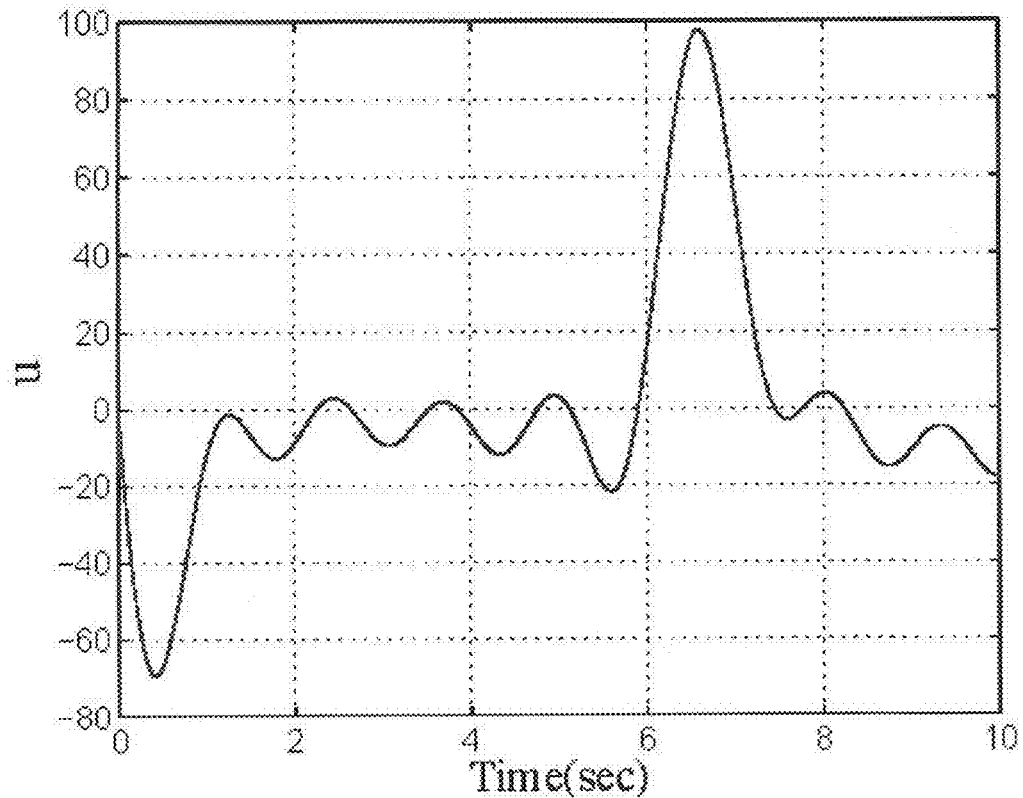
FIG.6C    u(k)
Simulation II: Model-Error Vector
$$\Gamma(k) = [m_1(k)\ m_2(k)\ u(k)]$$

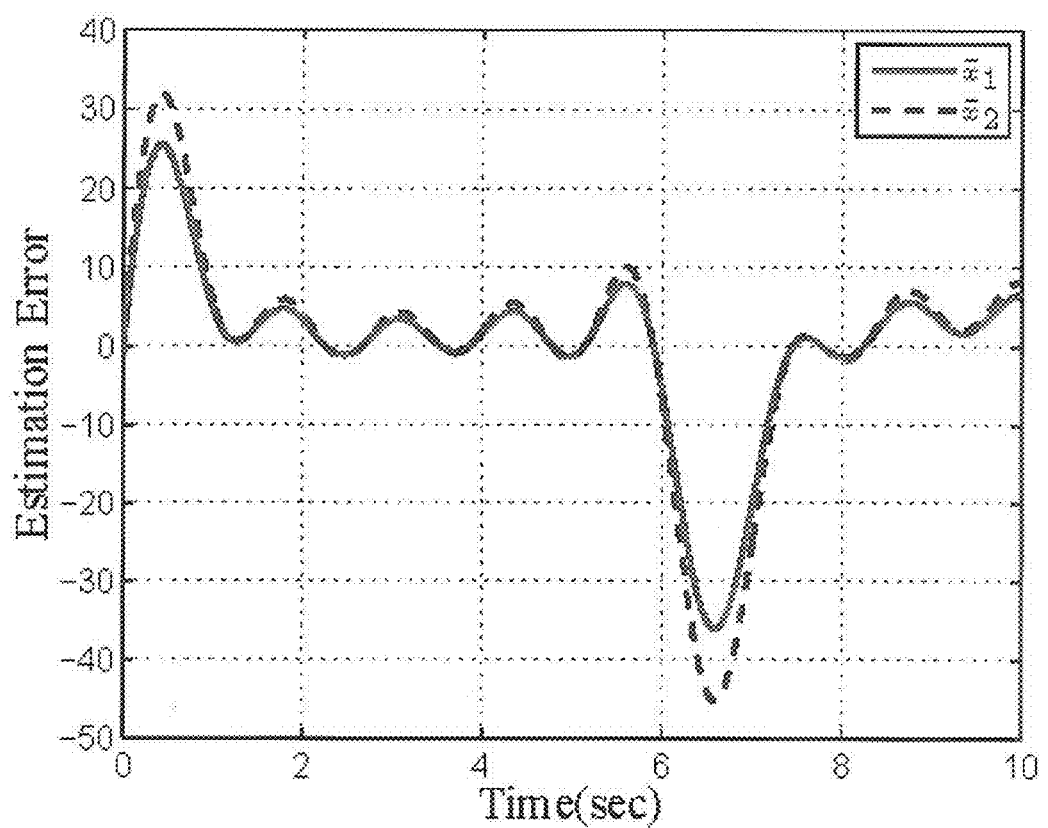
FIG. 7A KALMAN FILTER

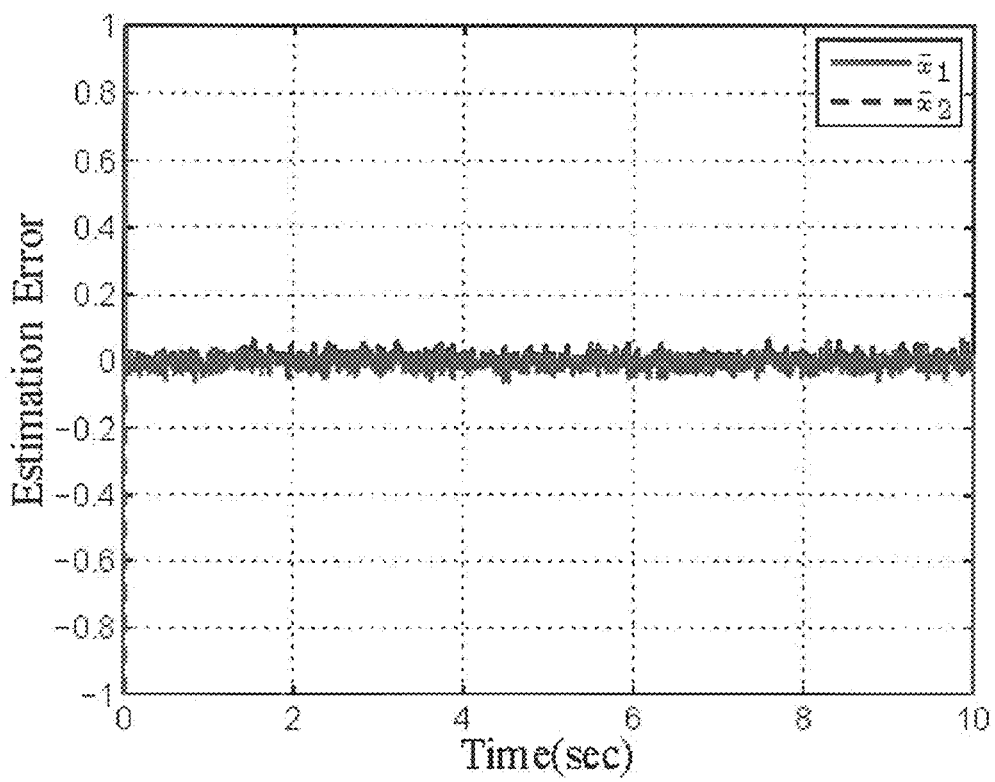
FIG. 7B PREFERRED EMBODIMENT KALMAN FILTER
SIMULATION II: STATE ESTIMATION ERROR

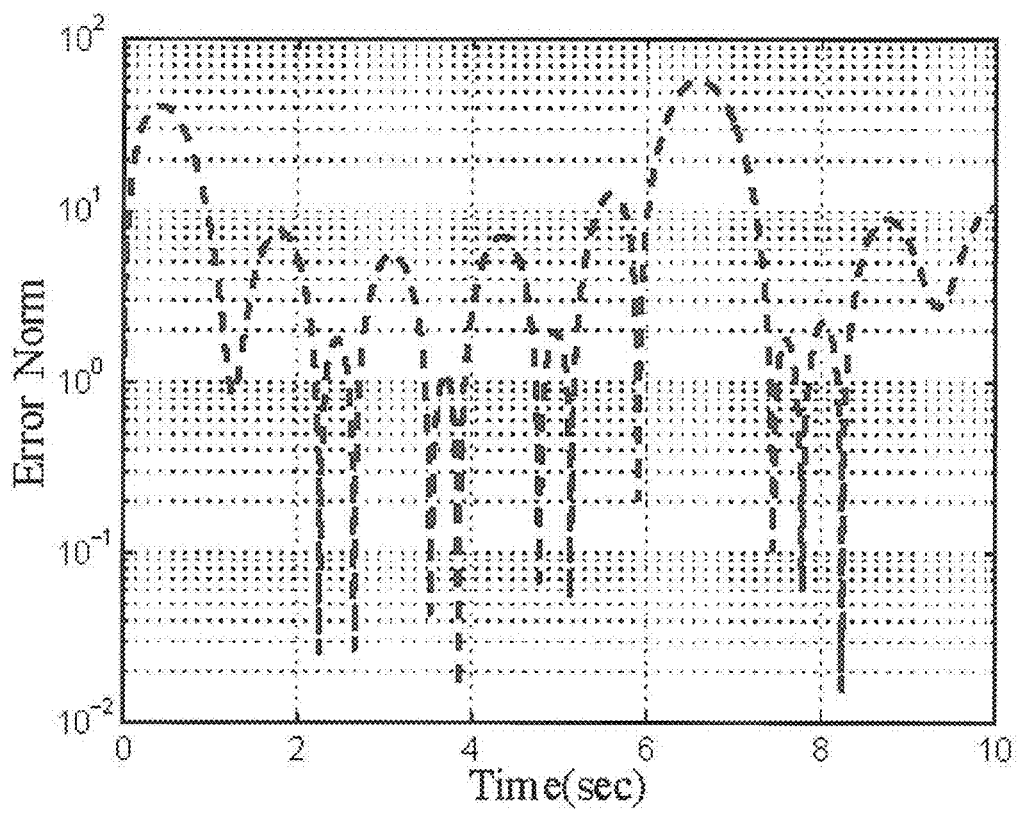
FIG. 8A KALMAN FILTER

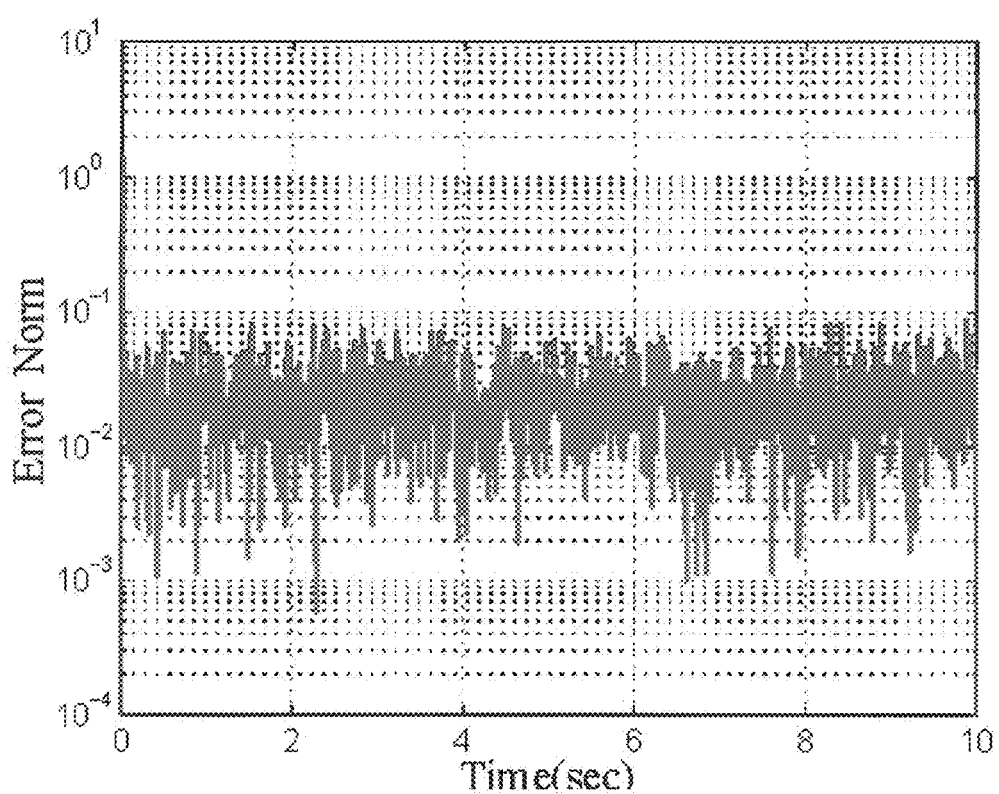
FIG. 8B PREFERRED EMBODIMENT KALMAN FILTER
SIMULATION II: STATE ESTIMATION ERROR NORM

ESTIMATION ALGORITHM FOR DISCRETE-TIME UNCERTAIN STOCHASTIC SYSTEMS AND DEVICE RELATING THERETO

STATEMENT OF GOVERNMENT INTEREST

The invention described herein may be manufactured, used, and licensed by or for the United States Government without the payment of royalties.

BACKGROUND

The terminology Kalman filter, as defined in Wikipedia, also known as linear quadratic estimator (LQE), refers to an algorithm that uses a series of measurements observed over time, containing noise (random variations) and other inaccuracies, and produces estimates of unknown variables that tend to be more precise than those based on a single measurement alone. The Kalman filter operates recursively on streams of noisy input data to produce a statistically optimal estimate of the underlying system state. Applications of the Kalman filter include guidance, navigation and control of vehicles, particularly aircraft and spacecraft, and time series analysis used in fields such as signal processing and econometrics.

The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state; no additional past information is required.

In general, estimation process deals with recovering the desired variables of a dynamic system from available measurements. Though estimators such as the Kalman filter has been successfully used in many engineering problems, it is based on assumptions that the dynamic model of the system under consideration is precisely known and the system dynamics/measurements are subjected to Gaussian processes with known statistics. Even though the Kalman filter possesses some innate robust characteristics, the estimator performance degradation in the presence of system uncertainties may not be tolerable. There exist four main approaches to deal with the robust estimation problem and they are based on i) H∞ filtering, ii) setvalued estimation, iii) guaranteed-cost filtering, and iv) regularized least-squares. All these approaches are compared in A. H. Sayed, "A framework for state-space estimation with uncertain models," Automatic Control, IEEE Transactions on, vol. 46, no. 7, pp. 998-1013 (July 2001), where relevant concerns on parameterizations, stability, robustness, and online implementation of each approach are addressed. None of these existing schemes can guarantee asymptotic convergence of the mean estimation error in the presence of persistent excitation or disturbance that is not asymptotically decaying to zero. Most of the current robust Kalman filter schemes only consider minor system parametric uncertainties or asymptotically decaying disturbance, if the disturbance is non-zero mean. Therefore, the estimates obtained using the existing schemes would yield biased estimates in the presence of persistent excitation. In H∞ filtering, estimators are designed to minimize the worst case H∞ norm of the transfer function from the noise inputs to the estimation error output. See for example, A. H. Sayed, "A Framework For State-Space Estimation With Uncertain Models," Automatic Control, IEEE Transactions on, Vol. 46, No. 7, pp 998-1013, (July 2001), de Souza, C. E., et al., "H∞ Estimation For Discrete Time Linear Uncertain Systems," International Journal of Robust and Nonlinear Control, Vol. 1, pp. 11-23, (1991). Xie, L., et al., "H∞ Filtering For Linear Periodic Systems With Parameter Uncertainty," Systems & Control Letters, Vol. 17, pp. 343-350, (1991), Nagpal, K. et al., "Filtering and smoothing in an H∞ setting," Automatic Control, IEEE Transactions on, Vol. 36, No. 2, pp. 152-166, (February 1991), Fu, M., et al. "H∞ estimation for uncertain systems," International Journal of Robust and Nonlinear Control, Vol. 2, pp. 87-105, (1992), Bernstein, D. S. et al., "Mixed-norm H2/H∞, Regulation and Estimation: The Discrete-time Case," Systems & Control Letters, vol. 1.6, pp. 235-248 (1991), and Wang, Z., et al., "Robust H2/H∞^state Estimation For Systems With Error Variance Constraints: The Continuous-time Case," Automatic Control, IEEE Transactions on, vol. 44, no. 5, pp. 1061-1065 (May 1999). Since H∞ filtering is a worst-case design method, while guaranteeing the worst-case performance, it generally sacrifices the average filter performance. A robust estimator design methodology based on iteratively solving a tradeoff problem between estimator performance and robustness is presented Xu, H., et al., "A Kalman Filter Design Based on the Performance/Robustness Tradeoff" Journal of Latex Class Files, Vol. 1, No. 11, pages 1-7 (November 2002). A robust state estimator for a class of uncertain systems where the noise and uncertainty are modeled deterministically via an integral quadratic constraint is presented in Savkin, A, et al. "Recursive State Estimation for Uncertain Systems with an Integral Quadratic Constraint," IEEE Transactions on Automatic Control, Vol. 40. No. 6, page 1080 (June 1995). This approach, known as the set-valued state estimation (see Bertsekas., et al. "Recursive State Estimation for a Set-Membership Description of Uncertainty"~EEE Transactions On Automatic Control, AC-16, No. 2, page 117 (April 1971) involves finding the set of all states consistent with given output measurements for a system with norm bounded noise input (see James, "Nonlinear State Estimation for Uncertain Systems with an Integral Constraint" IEEE Transactions on Signal Processing, Vol. 46, No. 11, page 2916 (November 1998). Robust estimation approach known as the guaranteed cost filtering is presented in Petersen, I., et al., "Robust State Estimation for Uncertain Systems," Proceedings of the 30$^{th}$ Conference on Decision and Control, F2-7-2:50, IEEE page 2630, Brighton, England, (December 1971), Xie, L., et al. "Robust Kalman Filtering for Uncertain Discrete-Time Systems" IEEE Transactions on Automatic Control, Vol. 39, No. 6, page 1310 (June 1994), and Petersen, I. et al. "Optimal Guaranteed Cost Control and Filtering for Uncertain Linear Systems" IEEE Transactions on Automatic Control, Vol. 39, No. 9, page 1971, (September 1994). Here, estimators are designed to guarantee that the steady-state variance of the state estimation error is upper bounded by a certain constant value for all admissible model uncertainties. Design of robust estimators that ensure minimum filtering error variance bounds for systems with parametric uncertainty residing in a polytope are given in Shaked, U., et al. "New Approaches to Robust Minimum Variance Filter Design" IEEE Transactions on Signal Processing, Vol. 49, No. 11, page 2620. (November 2001) and de Souza, C., et al., "Robust Filtering for Linear Systems With Convex-Bounded Uncertain Time-Varying Parameters," IEEE Transactions on Automatic Control, Vol. 52, No. 6, page 1132, (June 2007). While the H∞ formulation and the guaranteed cost filtering involves de-regularization, a robust estimator design based on the regularized least-squares approach is presented in Sayed, Ali H. "A Framework for State-Space Estimation with Uncertain Models" IEEE Transactions on Automatic Control, Vol. 46, No. 7, Page 998, (July 2001). Extension of the regularized least squares approach to time-delay systems and time varying system are presented in Subramanian, A., et al. "Multiobjective Filter Design for Uncertain Stochastic Time-Delay Systems" IEEE Transactions on Automatic Control, Vol. 49, No. 1, Page 149, (January 2004) and Subramanian, A., et al., "Regularized Robust Filters for Time-Varying Uncertain Discrete-Time Systems" IEEE Transactions On Automatic Control, Vol. 49, No. 6, Page 970 (June 2004), respectively. Petersen and Savkin provides a comprehensive research monograph on robust filtering for both discrete and continuous time systems from a deterministic as well as H∞ point of view I. R. Petersen and A. V. Savkin. "Robust Kalman Filtering For Signals and Systems with Large Uncertainties." Boston, Mass.: Birkhauser, 1999. More recently, Neveux, P., et al., "Robust Filtering for Linear Time-Invariant Continuous Systems" IEEE Transactions On Signal Processing, Vol. 55. No. 10, Page 4752 (October 2007) and Zhou, Tong, "Sensitivity Penalization Based Robust State Estimation for Uncertain Linear Systems," IEEE Transactions on Automatic Control, Vol. 55, No. 4, Page 1018 (April 2010) propose a robust filtering approach based on penalizing the sensitivity of estimation errors to parameter variations. Furthermore, the optimal joint filtering and parameter identification problem for uncertain linear stochastic systems with unknown parameters in both state and observation equations is tackled in Basin, M., et al., "Optimal Filtering for Uncertain Linear Stochastic Systems," Joint 48th IEEE Conference on Decision and Control and 28th Chinese Control Conference Shanghai, P. R. China, ThA07.4, page 3376 (Dec. 16-18, 2009)

SUMMARY OF THE INVENTION

A preferred method for estimation of a system having state variables representing the state of the system comprising predicting the estimate of the state variables along with the uncertainties in the state variables; observing a measurement of at least one state variable corrupted with some amount of error; updating the estimates of the state variables using a weighted average, with more weight being given to estimates with higher certainty; and providing an estimator input to update the estimates of the state variables, the estimator input operating to provide asymptotic convergence of the mean estimation error in all of the state variables in the presence of persistent excitation or disturbance that is not asymptotically decaying to zero.

Optionally, the system is defined by a process model, and the process model dynamics defining the state variables are unknown. The process model that may be represented as $$x(k+1)=Ax(k)+w(k)+\omega(k)$$

where k represents time, x is the state vector comprising the unknown state variables, A represents the system matrix comprising unknown elements, w(k) is unknown persistent excitation, ω(k) is the n dimensional Gaussian white noise process, and wherein the measurement or output may be represented by vector y(k) where $$y(k)=Cx(k)+v(k)$$

where C is the output matrix, and v(k) is the n-dimensional Gaussian white noise process. Both the process measurement model and persistent excitation or disturbance may be unknown.

Optionally, the estimator input may be represented by the vector η(k+1) defined as $$\eta(k+1)=\chi^{-1}\Lambda(I-HK)\tilde{y}(k+1)$$

where k represents time, K is the Kalman gain. H is the extended output matrix defined as $$H \triangleq [C_m \; I_{m \times m}],$$

where $C_m$ is the assumed output matrix model, $I_{m \times m}$ is an identity matrix of size m by m where m is the number of uncertain measurements or variables ỹ(k+1) is defined as $$\tilde{y}(k+1)|=[y(k+1)-HF\hat{z}(k)],$$

and F and G are defined as $$F \triangleq \begin{bmatrix} A_m & 0 \\ 0 & -\frac{1}{2}I_{m \times m} \end{bmatrix},$$

$$G = \begin{bmatrix} I_{n \times n} \\ \Delta C \end{bmatrix},$$

where $A_m$ is the assumed state matrix model, $\Delta C = \{C-C_m\}$, and the matrices χ and Λ are obtained by simultaneously solving a linear matrix inequality which may be represented as $$F^T[I-K_{ss}H]^T\chi[I-K_{ss}H]F+S-\chi \leq 0 \; \chi=H^T\Lambda^T$$

where S is a positive definite matrix design value, where $K_{ss}$ is the steady state Kalman gain.

Optionally, the estimator error is limited such that $$\lim_{k \to \infty} E[z(k) - \hat{z}(k)] = 0$$

where k represents time, and z(k) is defined as the extended model of x and n combined such that $z(k)=[X^T(k)n^T(k)]$, $n(k)=\{C-C_m\}x(k)$, where C is the output matrix and $C_m$ is the assumed output matrix.

Optionally, the process may be utilized to track a target using the state variable defining target dynamics, the process state being the target state and the estimator error input is the tracking error input.

A preferred embodiment system may be a linear time-invariant stochastic system that may be represented by the following equation:

$$x(k+1)=Ax(k)+w(k)+\omega(k)$$

where $x(k) \in \mathfrak{R}^n$ is the state vector, $w(k) \in \mathfrak{R}^n$ is the unknown persistent excitation, ω(k) is the n-dimensional Gaussian white noise process, and ω(k)~ $\mathcal{N}$ (0, $\mathcal{Q}$), where $\mathcal{N}$ is defined as Normal probability distribution, $\mathcal{Q}$ is the known noise covariance, $\mathcal{Q} \in \mathfrak{R}^{n \times n}$ is the process noise covariance, and the elements of the system matrix $A \in \mathfrak{R}^{n \times n}$ are unknown, and the target model is measurement equation is given as (shown in Box 203, FIG. 2A)

$$y|(k)=Cx(k)+v(k)$$

where $y(k) \in \mathfrak{R}^m$ is the output vector and v(k) is the n dimensional Gaussian white noise process, such that v(k)~

$\mathcal{N}(0, R)$ where the output matrix $C \in \mathfrak{R}^{m \times n}$ is assumed to be known and the measurement covariance $R \in \mathfrak{R}^{m \times m}$ is assumed to be known.

Optionally, the method may comprise:
providing an assumed process model which may be represented by $$x_m(k+1) = A_m x_m(k) + \overline{\omega}(k)$$

where $\overline{\omega}(k)$ is the zero mean Gaussian process noise with known covariance;
providing an assumed measurement model which may be represented by $$y_m(k) = C_m x_m(k) + v(k);$$

providing model error vectors which may be represented by n(k) and m(k) where (as shown in Box 205, FIG. 2A)

$$m(k) = \{A - A_m\} x(k) + w(k)$$

$$n(k) = \{C - C_m\} x(k),$$

and
providing extended dynamics (as shown in Box 206, FIG. 2A) which may be represented by $$\begin{bmatrix} x(k+1) \\ n(k+1) \end{bmatrix} = \begin{bmatrix} A_m & 0 \\ 0 & -\frac{1}{2} I_{m \times m} \end{bmatrix} \begin{bmatrix} x(k) \\ n(k) \end{bmatrix} + \begin{bmatrix} m(k) \\ u(k) \end{bmatrix} + \begin{bmatrix} I_{n \times n} \\ \Delta C \end{bmatrix} \omega(k)$$

where
$\Delta C \triangleq \{C - C_m\}$
$I_{n \times n} \triangleq$ an identity matrix of dimension n×n
$u(k) \triangleq \{(C - C_m)\}\{[A_m + \frac{1}{2} I_{n \times n}] x(k) + m(k)\}$;
providing extended process dynamics in matrix notation which may be represented by $$z(k+1) = Fz(k) + \Gamma(k) + G\omega(k)$$

where $$z(k) \triangleq [x^T(k) \ n^T(k)]^T$$

$$F \triangleq \begin{bmatrix} A_m & 0 \\ 0 & -\frac{1}{2} I_{m \times m} \end{bmatrix}$$

$$r(k) \triangleq [m^T(k) \ u^T(k)]^T$$

$$G \triangleq \begin{bmatrix} I_{n \times n} \\ \Delta C \end{bmatrix};$$

providing an extended measurement process in matrix notation which may be represented by $$y(k) = Hz(k) + v(k)$$

where $H \triangleq [C_m \ I_{m \times m}]$ providing an assumed extended target or process model which may be represented by $$z_m(k+1) = Fz_m(k) + G_m \overline{\omega}(k)$$

where $$G_m \triangleq \begin{bmatrix} I_{n \times n} \\ O_{m \times n} \end{bmatrix}.$$

solving a linear matrix inequality (from Box 212, FIG. 2B): for $\chi$ and $\Lambda$ for any $S > 0$ $$\begin{bmatrix} (F^T[I - K_{ss}H]^T \mathcal{X} \times [I - K_{ss}H]F + S - \mathcal{X}) & \mathcal{X} - H^T \Lambda^T \\ \mathcal{X}^T - \Lambda H & 0_{(n+m) \times (n+m)} \end{bmatrix} \leq 0$$

wherein $K_{ss}$ is the steady state Kalman gain obtained from solving the algebraic matrix Riccati equation which may be represented by (from Box 211, FIG. 2B):

$$P_{ss} = FP_{ss}F^T - FP_{ss}H^T[HP_{ss}H^T + R]^{-1}HP_{ss}F^T + G_m QG_m^T$$

$$K_{ss} = P_{ss}H^T(HP_{ss}H^T + R)^{-1};$$

calculating an estimator input (from Box 213, FIG. 2B), which may be represented by $$\eta(k+1) = \chi^{-1} \Lambda (I - HK) \overline{y}(k+1)$$

and providing an estimator or tracker (from Box 214, FIG. 2B)

$$\hat{z}(k+1) = F\hat{z}(k) + K_{ss}[y(k+1) - HF\hat{z}(k)] + \eta(k+1)$$

operatively associated with an estimator error or tracking error guarantee (from Box 214, FIG. 2B)

$$\lim_{k \to \infty} E[z(k) - \hat{z}(k)] = 0,$$

wherein the estimator or tracker is utilized for one of tracking vehicles, particularly aircraft and spacecraft, and time series analysis used in fields such as signal processing and econometrics.

A preferred embodiment may comprise a stochastic system operating in the presence of persistent excitation or disturbance; the system being represented by state variables representing the state of the system; the device comprising:
a representation of the stochastic system including estimates of state variables and a measurement of at least one state variable corrupted with some amount of error;
at least one processor for predicting the estimates of the state variables along with the uncertainties in the state variables, the at least one processor operating to update the estimates of the state variables using a weighted average, with more weight being given to estimates with higher certainty, and an estimator input, the estimator input operating to provide asymptotic convergence of the mean estimation error in all of the state variables in the presence of persistent excitation or disturbance that is not asymptotically decaying to zero.

Optionally, the preferred embodiment system may be for tracking a linear time-invariant stochastic system that may be represented by the following equation:

$$x(k+1) = Ax(k) + w(k) + \omega(k)$$

where $x(k) \in \mathfrak{R}^n$ is the state vector, $w(k) \in \mathfrak{R}^n$ is the unknown persistent excitation, $\omega(k)$ is the n-dimensional Gaussian white noise process, and $\omega(k) \sim \mathcal{N}(0, \mathcal{Q})$, where $\mathcal{Q}$ is the known noise covariance, $\mathcal{Q} \in \mathfrak{R}^{n \times n}$ is the process noise covariance, and the elements of the system matrix $A \in \mathfrak{R}^{n \times n}$ are unknown, and the target model is measurement equation is given as $$y(k) = Cx(k) + v(k)$$

where $y(k) \in \mathfrak{R}^m$ is the output vector and $v(k)$ is the n dimensional Gaussian white noise process, such that $v(k) \sim$ $\mathcal{N}(0, R)$ where the output matrix $C \in \mathfrak{R}^{m \times n}$ is assumed to be known and the measurement covariance $R \in \mathfrak{R}^{m \times m}$ is assumed to be known.

Another preferred embodiment comprises an improved Kalman filter programmed to update at least one state variable corrupted with some amount of error by providing an estimator input to update the estimate of the at least one state variable, the estimator input operating to provide asymptotic convergence of the mean estimation error in all of the state variables in the presence of persistent excitation or disturbance that does not asymptotically decay to zero.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 1 illustrates a summary of a preferred embodiment robust Kalman Filter Algorithm.

FIG. 2A illustrates elements 201-206 of a preferred embodiment robust Kalman Filter Algorithm.

FIG. 2B illustrates elements 207-215 of a preferred embodiment robust Kalman Filter Algorithm.

FIG. 3A is an illustration of a first example of persistently exciting disturbances.

FIG. 3B is an illustration of a second example of persistently exciting disturbances.

FIG. 4A is a graphical illustration of estimation error versus time for a Kalman filter.

FIG. 4B is a graphical illustration of simulated estimation error versus time for a preferred embodiment filter.

FIG. 5A shows the estimation error norm obtained for the Kalman Filter estimator.

FIG. 5B shows the estimation error norm obtained for the preferred embodiment filter estimator, FIG. 6A illustrates a graph showing $m_1(k)$ for model error vector $\Gamma(k)$ for simulation II.

FIG. 6B illustrates a graph showing $m_2(k)$ for model error vector $\Gamma(k)$ for the simulation II.

FIG. 6C illustrates a graph showing $u(k)$ for model error vector $\Gamma(k)$ for the simulation II.

FIG. 7A illustrates the state estimation error obtained using the traditional Kalman filter.

FIG. 7B illustrates the estimation error obtained from the preferred embodiment robust Kalman filter.

FIG. 8A shows the estimation error norm obtained using the traditional Kalman filter.

FIG. 8B shows the estimation error noun for simulation II obtained using the preferred embodiment filter indicating that the performance of the preferred embodiment robust Kalman filter is superior to that of the traditional Kalman filter when there are system uncertainties. It is noted that the performance of the preferred embodiment robust estimator given in FIGS. 7B and 8B are similar to the ones given in FIGS. 4B and 5B.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. Thus, a first element discussed below could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Though estimators such as the Kalman filter have been successfully used in many engineering problems, most are based on assumptions that the dynamic model of the system under consideration is precisely known and the system dynamics/measurements are subjected to Gaussian processes with known statistics. Even though the Kalman filter possesses some innate robust characteristics, the estimator performance degradation in the presence of system uncertainties may not be tolerable. The robust estimation problem described in conjunction with a preferred embodiment of the present invention involves recovering unmeasured state variables when the available plant model and the noise statistics are uncertain. There exist four main approaches to deal with the robust estimation problem and they are based on i) H∞ filtering, ii) setvalued estimation, ii) guaranteed-cost filtering, and i) regularized least-squares. All these approaches are compared in A. H. Sayed, "A framework for state-space estimation with uncertain models," Automatic Control, IEEE Transactions on, vol. 46, no. 7, pp. 998-1013 (July 2001)(herein incorporated by reference) where relevant concerns on parameterizations, stability, robustness, and online implementation of each approach are addressed. None of these existing schemes can guarantee asymptotic convergence of the mean estimation error in the presence of persistent excitation or disturbance that is not asymptotically decaying to zero. Most of the current robust Kalman filter schemes only consider minor system parametric uncertainties or asymptotically decaying disturbance, if the disturbance is non-zero mean. Therefore, the estimates obtained using the existing schemes would yield biased estimates in the presence of persistent excitation.

A preferred embodiment of the present invention comprises the formulation of a robust estimator for uncertain linear stochastic systems under persistent excitation. The proposed estimator guarantees asymptotic convergence of the estimation error even in the presence of persistent excitation. In contrast to the existing approaches, the main contributions are given below:

The preferred embodiment robust Kalman filter scheme dictates that the estimation error is asymptotically unbiased and exponentially bounded in mean•square.

Unlike existing approaches, the preferred embodiment filter does not require a known upper bound on system uncertainty.

Formulation considers uncertainties in both system and output matrices as well as an unknown persistently exciting signal.

A preferred embodiment of the invention will be described as follows. A detailed problem formulation and the development of the robust estimator are first given in sections I and II, respectively. Numerical simulations are presented in section III to further illustrate the performance of the proposed robust estimator.

Problem Formulation

Consider a linear time-invariant stochastic system that may be represented by the following equation:

$$x(k+1)=Ax(k)+w(k)+\omega(k). \quad (1)$$

where $x(k) \in \mathfrak{R}^n$ is the state vector, $w(k) \in \mathfrak{R}^n$ is the unknown persistent excitation, $\omega(k)$ is the n-dimensional Gaussian white noise process, i.e., $\omega(k) \sim \mathcal{N}(0, \mathcal{Q})$. The process noise covariance $\mathcal{Q}$ is the known noise covariance, $\mathcal{Q} \in \mathfrak{R}^{n \times n}$ is the process noise covariance, and the elements of the system matrix $A \in \mathfrak{R}^{n \times n}$ are unknown As presented Box 101 of FIG. 1, the measurement equation may be given as $$y|(k)=Cx(k)+v(k), \quad (2)$$

where $y(k) \in\_m$ is the output vector and $v(k)$ is the n dimensional Gaussian white noise process, i.e., $v(k) \sim N(0, R)$.

The output matrix $C \in \mathfrak{R}^{m \times n}$ is assumed to be unknown and the measurement covariance $R \in \mathfrak{R}^{m \times m}$ is assumed to be known. Definition 1: The stochastic process $w(k)$ is persistently exciting over an interval with level $\alpha$ (See, for example, M. Green and J. B. Moore, "Persistence of Excitation in Linear Systems," Systems & Control Letters, vol. 7, no. 5, pp. 351-360, (1986)) (herein incorporated by reference) if $$\sum_{i=k}^{k+l} w(i)w^T(i) \geq \alpha l \times I_{n \times n}, \text{ almost surely } (a.s) \quad (3)$$

for some $\alpha>0$, $l \geq n$, and $\forall k>0$.

Note that the true system state, A, and the output matrix, C, are unknown. The assumed (known) system matrix and output matrix are given as Am and Cm, respectively. Define $$m(k)=\{A-A_m\}x(k)+w(k), \text{ and} \quad (4)$$

$$n(k)=\{C-C_m\}x(k) \quad (5)$$

Now the system equation and the output equation may be rewritten in terms of the assumed system matrix, $A_m$, and the assumed output matrix, $C_m$, as $$x(k+1)=A_m x(k)+m(k)+\omega(k) \quad (6)$$

$$y(k)=C_m x(k)+n(k)+v(k) \quad (7)$$

Assumption 1: The persistent disturbance, $w(k)$, is almost surely upper bounded as follows $$\mathbb{P}\left(\sup_{k \geq 0}|w(k)| < \infty\right) = 1 \quad (8)$$

where $|\cdot|$ is the one-norm, i.e., $|x|=\Sigma_i|\chi_i|$

Assumption 2: Eigenvalues of the matrices A and Am are within the unit circle. The assumption of the stability of the uncertain system is a weak one, as it is rare that an estimator be applied 'open-loop' to an unstable system (see I. R. Petersen and D. C. McFarlane, "Robust State Estimation For Uncertain Systems," in Decision and Control, Proceedings of the 30th IEEE Conference on, vol. 3, pp. 2630-2631 (December 1991 (herein incorporated by reference. From (5), $n(k+1)$ can be written as $$n(k+1)=\{C-C_m\}\{A_m x(k)+m(k)+\omega(k)\} \quad (9)$$

The stochastic process $u(A)$ is defined as $$u(k)=\{C-C_m\}\{[A_m+\tfrac{1}{2}I_{n \times n}]x(k)+m(k)\} \quad (10)$$

After appending $n(k+1)$ to the system equation the extended system may be written as $$\begin{bmatrix} x(k+1) \\ n(k+1) \end{bmatrix} = \begin{bmatrix} A_m & 0 \\ 0 & -\tfrac{1}{2}I_{m \times m} \end{bmatrix} \begin{bmatrix} x(k) \\ n(k) \end{bmatrix} + \begin{bmatrix} m(k) \\ u(k) \end{bmatrix} + \begin{bmatrix} I_{n \times n} \\ \Delta C \end{bmatrix} \omega(k) \quad (11)$$

where $\Delta C=\{C-C_m\}$. Define $z(k)=[\underline{x}^T(k)\ n^T(k)]^T$.

$$F = \begin{bmatrix} A_m & 0 \\ 0 & -\tfrac{1}{2}I_{m \times m} \end{bmatrix}, \quad G = \begin{bmatrix} I_{n \times n} \\ \Delta C \end{bmatrix}$$

and $\Gamma(k)=[m^T(k)\ u^T(k)]^T$. Now the above equation may be written as $$z(k+1)=Fz(k)+\Gamma(k)+G\omega(k) \quad (12)$$

and the output equation may be written as $$y(k)=Hz(k)+v(k) \quad (13)$$

where $H=[C_m\ I_{m \times m}]$. If there is no system uncertainties, i.e., $A_m=A$, $C_m=C$, $\hat{w}(k)=0$, and $\omega(\hat{k})=\overline{\omega}(k)$ is an n-dimensional Gaussian white noise process with known covariance Q, then Γ(k) is identically zero for all k and the system in (12) can be written as $$z_m(k+1) = F z_m(k) + G_m \overline{\omega}(k) \quad (14)$$

where $G_m = [I_{n \times n} \; 0_{n \times m}]^{-T}$. For the system in (14), an optimal estimator, such as a Kalman filter (See A. H. Jazwinski, Stochastic Processes and Filtering Theory. Mineola, N.Y.: Dover Publications. Inc., pages 200-201 (1998), of the following form can be designed:

Initialize $$\hat{z}_m^+(0) = z_0, P^+(0) = P_0 \quad (15)$$

Prediction $$\hat{z}_m^-(k+1) = F \hat{z}_m^+(k) \quad (16)$$

$$P^-(k+1) = F P^+(k) F^T + G_m Q G_m^T \quad (17)$$

Update $$K(k+1) = P^-(k+1) H^T (H P^-(k+1) H^T + R)^{-1} \quad (18)$$

$$\hat{z}_m^+(k+1) = \hat{z}_m^-(k+1) + K(k+1)[y_m(k+1) - H \hat{z}_m^-(k+1)] \quad (19)$$

$$P^+(k+1) = P^-(k+1) - K(k+1) H P^-(k+1) \quad (20)$$

where $y_m(k) = H z_m(k) + v(k)$ is the measurement model and the matrix. $P^+(k+1) \in \Re^{(n+m) \times (n+m)}$ is the a posteriori error covariance matrix, and $k \in \Re^{(n+m) \times m}$ is the Kalman gain. Although the Kalman filter uses time varying gain, K(k) it is well known that for time invariant systems, this gain will converge to a steady state value if the pair (F, H) is detectable (see, G. De Nicolao and M. Gevers, "Difference and Differential Equations: A Note On The Convergence To The Strong Solution," Automatic (Control, IEEE Transactions on, Vol. 37, No. 7, pp. 1055-1057, (July 1992)(herein incorporated by reference). In practice the Kalman filter gain usually converges in few steps. Therefore, one can assume that the filter gain is operating at steady-state.

As shown in Box 211, FIG. 2B, the steady state gain, $K_{ss}$, can be obtained as $$K_{ss} = P_{ss} H^T (H P_{ss} H^T + R)^{-1} \quad (21)$$

where the steady-state error covariance. $P_{ss}$, can be obtained by solving the discrete-time algebraic Riccati equation (see, J. L. Crassidis and J. L. Junkins, "Optimal Estimation of Dynamic System," Boca Raton, Fla.: CRC, (2004) ch. 56)(herein incorporated by reference):

$$P_{ss} = F P_{ss} F^T - F P_{ss} H^T [H P H^T + R]^{-1} H P F^T + G_m Q G_m^T \quad (22)$$

After substituting (16) into (19), the steady-state estimation process can be written as $$\hat{z}_m(k+1) = F \hat{z}_m(k) + K_{ss}[y_m(k+1) - H F \hat{z}_m(k)] \quad (23)$$

Now subtracting (23) from (14), the estimator error dynamics may be written as $$\tilde{z}_m(k+1) = F \tilde{z}_m(k) + G_m \overline{\omega}(k) - K_{ss}[y_m(k+1) - H F \hat{z}_m(k)] \quad (24)$$

where $\tilde{z}_m(k) = z_m(k) - \hat{z}_m(k)$. Also it can be shown that $\tilde{z}_m(k)$ is unbiased and the steady-state value of the error covariance is given as (see, A. H. Jazwinski, Stochastic Processes and Filtering Theory. Mineola, N.Y.: Dover Publications, Inc., pages 200-201, (1998)(herein incorporated by reference):

$$\lim_{k \to \infty} E[\tilde{z}_m(k) \tilde{z}_m^T(k)] = P_{ss}. \quad (25)$$

Given next is the formulation of a robust estimator which guarantees the asymptotic convergence of the true state estimation error to the desired optimal error, $\tilde{z}_m$.

Formulation

Presented in Box 106 of FIG. 1 is an estimator of the following form $$\hat{z}(k+1) = F \hat{z}(k) + K_{ss}[y(k+1) - H F \hat{z}(k)] + \eta(k+1) \quad (26)$$

where η(k+1) is a signal whose details are to be explained in the following. Let $\tilde{y}(k+1) = [y(k+1) - H F \hat{z}(k)]$ denote the innovations process, now the estimator dynamics in (26) can be written as $$\hat{z}(k+1) = F \hat{z}(k) + K_{ss} \tilde{y}(k+1) + \eta(k+1) \quad (27)$$

Define $\check{z}(k) = z(k) - \hat{z}(k)$, now subtracting (27) from (12), the estimator error dynamics may be written as $$\check{z}(k+1) = F \check{z}(k) + \Gamma(k) + G \omega(k) - K_{ss} \tilde{y}(k+1) - \eta(k+1) \quad (28)$$

Define ξ(k) as the difference between the desired estimation error and the true estimation error, i.e., $\xi(k) = \check{z}(k) - \tilde{z}_m(k)$. After subtracting (24) from (28), ξ(k+1) can be written as $$\xi(k+1) = F \xi(k) + \Gamma(k) + G \omega(k) - K_{ss} \tilde{y}(k+1) - \eta(k+1) - G_m \overline{\omega}(k) + K_{ss} \tilde{y}_m(k+1) \quad (29)$$

where $\tilde{y}_m(k+1) = \{y_m(k+1) - H F \hat{z}_m(k)\}$. Note that after substituting (12) and (14), $\tilde{y}(k+1) - \tilde{y}_m(k+1)$ can be written as $$\tilde{y}(k+1) - \tilde{y}_m(k+1) = H F \xi(k) + H \Gamma(k) + H G \omega(k) - H G_m \overline{\omega}(k) \quad (30)$$

Substituting (30) into (29) yields $$\xi(k+1) = (I - K_{ss} H) \{F \xi(k) + \Gamma(k) + G \omega(k) - G_m \overline{\omega}(k)\} - \eta(k+1) \quad (31)$$

Lemma 1: Assume there exists a stochastic process $V(\xi_k)$ as well as real numbers $\underline{v}$, $\overline{v}$, μ>0 and 0<α≤1 such that $$\underline{v} \|\xi_k\|^2 \leq V(\xi_k) \leq \overline{v} \|\xi_k\|^2 \quad (32)$$

and $$E[V(\xi_{k+1}) | \xi_k] - V(\xi_k) \leq \mu - \alpha V(\xi_k) \quad (33)$$

are fulfilled for every solution of (31). Then the stochastic process $\xi_k$ is exponentially mean-square bounded, i.e., $$E[\|\xi(k)\|^2] \leq \frac{\overline{v}}{\underline{v}} E[\|\xi(0)\|^2](1-\alpha)^k + \frac{\mu}{\underline{v}} \sum_{i=1}^{n-1} (1-\alpha)^i, \quad (34)$$

for every n≥0. Moreover ξk is bounded with probability one, i.e., $$\mathbb{P}\left( \sup_{k \geq 0} \|\xi(k)\| < \infty \right) = 1. \quad (35)$$

Proof: See Lemma 2.1 in [27].

Theorem 1: Assume there exist a positive definite symmetric matrix $\chi \in \Re^{(n+m) \times (n+m)}$ such that (as presented also in Box 105 of FIG. 1 as the Estimator Input):

$$F^T [I - K_{ss} H]^T \chi [I - K_{ss} H] F + S - \chi \leq 0, \quad (36)$$

$\sigma_{min}(\chi) \geq 1$. $\sigma_{min}(S) \geq \alpha \sigma_{max}(\chi)$ for some real number 0<α≤1, and $$\chi = H^T \Lambda^T. \quad (37)$$

Here $\sigma_{min}(\bullet)(\sigma_{max}(\bullet))$ denotes the minimum (maximum) singular value, $S \in \Re^{(\tilde{n}+m) \times (\tilde{n}+m)}$ is a positive definite matrix and $\Lambda \in \Re^{(n+m) \times (n+m)}$. Then the stochastic process ξ(k) that satisfies (31) is bounded with probability one, and exponentially bounded in mean square, i.e., for a scalar quantity $\beta>0$, we have $$E[|\xi(k)|^2] \le \sigma_{max}(\chi) E[|\xi(0)|^2](1-\alpha)^k + \beta, \quad (38)$$

if the estimator inputs, $\eta(k+1)$, are selected as $$\eta(k+1) = \chi^{-1} \Lambda (I-HK) \tilde{y}(k+1). \quad (39)$$

Proof: Consider a stochastic process $$V(\xi_k) = \xi_k^T \chi \xi_k$$

Based on (31) $V(\xi_{k+1})$ can be obtained as $$V(\xi_{k+1}) = \xi_k^T F^T [I-K_{ss}H]^T \chi [I-K_{ss}H] F\xi_k - \varphi_k^T \chi \varphi_k + 2\xi_{k+1}^T \chi \varphi_k$$

where $\varphi_k = (I-K_{ss}H)\{\Gamma(k)+G\omega(k)-G_m\overline{\omega}(k)\} - \eta(k+1)$ is defined for notational simplicity. After substituting (37), $V(\xi_{k+1})$ can be written as $$V(\xi_{k+1}) = \xi_k^T F^T [I-K_{ss}H]^T \chi [I-K_{ss}H] F\xi_k - \varphi_k^T \chi \varphi_k + 2\xi_{k+1}^T H^T \Lambda^T \varphi_k$$

Note:

$$\tilde{y}(k+1) = H\tilde{z}(k+1) + v(k) + HK_{ss}\tilde{y}(k+1) + H\eta(k+1)$$

and $$\tilde{y}_m(k+1) = H\tilde{z}_m(k+1) + v(k) + HK_{ss}\tilde{y}_m(k+1)$$

Thus $$\tilde{y}(k+1) - \tilde{y}_m(k+1) = H\tilde{z}(k+1) - H\tilde{z}_m(k+1) + H\eta(k+1) + HK_{ss}\{\tilde{y}(k+1) - \tilde{y}_m(k+1)\}$$

Above equation may be rewritten as $$\{I-HK_{ss}\}(\tilde{y}(k+1) - \tilde{y}_m(k+1)) = H\xi(k+1) + H\eta(k+1)$$

Now substituting $\{I-HK_{ss}\}(\tilde{y}(k+1)-\tilde{y}_m(k+1)) - H\eta(k+1) = H(\xi_{k+1})$ yields $$V(\xi_{k+1}) = \xi_k^T F^T [I - K_{ss}H]^T \chi [I - K_{ss}H] F\xi_k - \varphi_k^T \chi \varphi_k +$$
$$2[\{I - HK_{ss}\}\tilde{y}(k+1) - H\eta(k+1)]^T \Lambda^T \varphi_k -$$
$$2[\{I - HK_{ss}\}\tilde{y}_m(k+1)]^T \Lambda^T \varphi_k$$

After plugging in the estimator inputs given in (39), an upper bound on $V(\xi_{k+1})$ can be obtained as $$V(\xi_{k+1}) \le \xi_k^T F^T [I-K_{ss}H]^T \chi [I-K_{ss}H] F\xi_k - \varphi_k^T \chi \varphi_k + \tilde{y}_m^T(k+1)\{I-HK_{ss}\}^T \Lambda^T \Lambda \{I-HK_{ss}\}\tilde{y}_m(k-1) + \varphi_k^T \varphi_k$$

Note that $\tilde{y}(k+1)$ is a zero mean Gaussian process with covariance $HP^-(k+1)H^T + R$. Therefore, an upper bound $\mu$ such that $$E \tilde{y}_m^T(k+1)\{I-HK_{ss}\}^T \Lambda^T \Lambda \{I-HK_{ss}\}\tilde{y}_m(k+1) \le \mu$$

can be easily obtained. Now based on the assumption that the minimum singular value of $\chi$ greater than or equal to one, i.e., $\sigma_{min}(\chi) \ge 1$, yields $$E[V(\xi_{k+1})|\xi_k] \le \xi_k^T F^T [I-K_{ss}H]^T \chi [I-K_{ss}H] F\xi_k + \mu$$

Now substituting (36) yields $$E[V(\xi_{k+1})|\xi_k] - V(\xi_k) \le \mu - \xi_k^T S \xi_k.$$

Based on the condition $\sigma_{min}(S) \ge \alpha \sigma_{max}(\chi)$ yields $$\mu - \xi_k^T S \xi_k \le \mu - \sigma_{min}(S)\xi_k^T \xi_k \le \mu - \alpha \sigma_{max}(\chi)\xi_k^T \xi_k \le \mu - \alpha \xi_k^T \chi \xi_k$$

Thus, this yields:

$$E[V(\xi_{k+1})|\xi_k] - V(\xi_k) \le \mu - \alpha V(\xi_k).$$

Let $1 \le \underline{v} = \sigma_{min}(\chi)$ and $\overline{v} = \sigma_{max}(\chi)$, i.e., $$\underline{v}\|\xi_k\|^2 \le \xi_k^T \chi \xi_k \le \overline{v}\|\xi_k\|^2.$$

Now based on the premises of Lemma 1, it can be concluded that the stochastic process $\xi_k$ is bounded with probability one and $$E[\|\xi(k)\|^2] \le \overline{v} E[\|\xi(0)\|^2](1-\alpha)^k + \mu \sum_{i=1}^{n-1}(1-\alpha)^i.$$

Now (38) follows from $$\sum_{i=1}^{n-1}(1-\alpha)^i \le \sum_{i=1}^{\infty}(1-\alpha)^i = \frac{1}{\alpha},$$

and $\beta = \mu/\alpha$.

Theorem 2: Suppose the conditions of theorem 1 hold, then for the uncertain stochastic system given in (12), and the state estimator given in (26), the corresponding estimation error from (28) is asymptotically stable in the first moment, i.e., $$\lim_{k \to \infty} E[\tilde{z}(k)] = 0.$$

Proof: Let $\hat{\xi}(k) = E[\xi(k)]$, $\hat{\Gamma}(k) = E[\Gamma(k)]$, and $\hat{\eta}(k) = E[\eta(k)]$. Now taking the expected value of (31) yields $$\hat{\xi}(k+1) = (I - K_{ss}H)\{F\hat{\xi}(k) + \hat{\Gamma}(k)\} - \hat{\eta}(k+1)$$

Consider a Lyapunov function $$V(\hat{\xi}_k) = \hat{\xi}_k^T \chi \hat{\xi}_k$$

Let $\hat{\varphi}_k = (I-K_{ss}H)\hat{\Gamma}(k) - \hat{\eta}(k+1)$, now following the same Steps given in the proof of theorem 1, yields $$V(\hat{\xi}_{k+1}) = \hat{\xi}_k^T F^T [I-K_{ss}H]^T \chi [I-K_{ss}H] F\hat{\xi}_k - \hat{\varphi}_k^T \chi \hat{\varphi}_k + 2E[H\hat{\xi}_{k+1}]^T \Lambda^T \hat{\varphi}_k$$

Now substituting $$H\xi(k+1) = \{I-HK_{ss}\}(\tilde{y}(k+1) - \tilde{y}_m(k+1)) - H\eta(k+1)$$

yields $$V(\hat{\xi}_{k+1}) = \hat{\xi}_k^T F^T [I - K_{ss}H]^T \chi [I - K_{ss}H] F\hat{\xi}_k - \hat{\varphi}_k^T +$$
$$2E[\{I - HK_{ss}\}\tilde{y}(k+1) - H\eta(k+1)]^T \Lambda^T \varphi_k -$$
$$2E[\{I - HK_{ss}\}\tilde{y}_m(k+1)]^T \Lambda^T \varphi_k$$

Since $\tilde{y}_m(k+1)$ is zero mean, substituting for $\eta(k+1)$ yields $$\Delta V = V(\hat{\xi}_{k+1}) - V(\hat{\xi}_k) \le -\hat{\xi}_k^T S \hat{\xi}_k < 0$$

and the asymptotic stability follows because the estimation error $\tilde{z}_m(k)$: is unbiased.

Implementation of the proposed robust estimator requires the matrices $\chi$ and $\Lambda$ that satisfies the conditions given in (36) and (37).

| | |
|---|---|
| Plant 101 | $x(k+1) = Ax(k) + w(k) + \omega(k)$ <br> $y(k) = Cx(k) + v(k)$ |
| Model 102 | $x_m(k+1) = A_m x_m(k) + \tilde{\omega}(k)$ <br> $y_m(k) = C_m x_m(k) + v(k)$ |
| Extended Plant 103 | $z(k+1) = Fz(k) + \Gamma(k) + G\omega(k)$ <br> $y(k) = Hz(k) + v(k)$ |
| Estimator Gain 104 | $P_{ss} = PP_{ss}F^T - FP_{ss}H^T [HPH^T + R]^{-1} HPF^T + G_m QG_m^T$ <br> $K_{ss} = P_{ss}H^T (HP_{ss}H^T + R)^{-1}$ |
| Estimator Input 105 | $F^T [I - K_{ss}H]^T \chi [I - K_{ss}H] F + S - \chi \le 0$ <br> $\chi = H^T \Lambda^T$ <br> $\eta(k+1) = \chi^{-1}\Lambda(I - HK)\hat{y}(k+1)$ |
| 106 Estimate | $\hat{z}(k+1) = F\hat{z}(k) + K_{ss} |y(k+1) - HP\hat{z}(k)| + \eta(k+1)$ |

As shown in S. Boyd, L. E, et al. "Linear Matrix Inequalities in System and Control Theory," ser. Studies in Applied Mathematics. Philadelphia, Pa.: SIAM, vol. 15 (1997), .matrices $\chi$ and $\Lambda$ that satisfies the conditions (36) and (37) can be obtained by solving the following linear matrix inequality (See Box 212 of FIG. 2B):

$$\begin{bmatrix} \begin{pmatrix} F^T[I-K_{ss}H]^T \chi \times \\ [I-K_{ss}H]F + S - \chi \end{pmatrix} & \chi - H^T\Lambda^T \\ \chi^T - \Lambda H & 0_{(n+m)\times(n+m)} \end{bmatrix} \le 0 \quad (40)$$

Matrices that satisfy the above LMI can be obtained by using the MATLAB LMI toolbox, as described in P. Gahinet, A. Nemirovski, A. J. Laub, and M. Chilali, "LMI Control Toolbox," The MathWorks, Inc., Natick, Mass., Tech. Rep., 1995, hereby incorporated by reference.

Table 1—Summary of Preferred Embodiment Kalman Filter Algorithm

Numerical Simulations

Performance of the proposed estimator is evaluated here though numerical simulations. For simulation purposes consider the following two-dimensional time-invariant model used in A. H. Sayed, "A Framework For State-Space Estimation With Uncertain Models," Automatic Control, IEEE Transactions on, vol. 46, no. 7, pp. 998-1013, (July 2001):

$$\begin{bmatrix} x_1(k+1) \\ x_2(k+1) \end{bmatrix} = \begin{bmatrix} 0.9802 & 0.1186 \\ 0 & 0.9802 \end{bmatrix} \begin{bmatrix} x_1(k) \\ x_2(k) \end{bmatrix} + \begin{bmatrix} w_1(k) \\ w_2(k) \end{bmatrix} + \begin{bmatrix} \omega_1(k) \\ \omega_2(k) \end{bmatrix}$$

The measurement equation is of the following form $$\begin{bmatrix} y_1(k) \\ y_2(k) \\ y_3(k) \end{bmatrix} = \begin{bmatrix} 0.5 & 0 \\ 1 & -1 \\ 0 & 1 \end{bmatrix} \begin{bmatrix} x_1(k) \\ x_2(k) \end{bmatrix} + \begin{bmatrix} v_1(k) \\ v_2(k) \\ v_3(k) \end{bmatrix}$$

The assumed matrices are selected as $$A_m = \begin{bmatrix} 0.9802 & 0.0196 \\ 0 & 0.9802 \end{bmatrix} \text{ and } C_m = \begin{bmatrix} 0.5000 & 0 \\ 1.0000 & -1.0000 \\ 0 & 0.8400 \end{bmatrix}$$

The processes $w_1(k)$ and $w_2(k)$ are given in FIG. 1. Since the measurement uncertainty is only associated with the last output, $n(k) \in \Re$ and thus the matrices F and H are defined as $$F = \begin{bmatrix} A_m & 0_{2\times 1} \\ 0_{1\times 2} & -\frac{1}{2} \end{bmatrix}$$

and $H = [C_m \; [0_{2\times 1} \; 1]^T]$, respectively.

System process noise covariance and the measurement noise covariance matrices are selected as $R = 10^{-2} \times I_{3\times 3}$ and $$Q = \begin{bmatrix} 1.9608 & 0.0195 \\ 0.0195 & 1.9605 \end{bmatrix}.$$

After defining $G_m = I_{2\times 2}$, the steady-state Kalman gain can be calculated as $$K = \begin{bmatrix} 0.6731 & 0.6572 & 0.6543 \\ 0.3445 & -0.1751 & 0.8213 \\ 0.0378 & -0.0199 & 0.1389 \end{bmatrix}$$

Next, two examples of different simulations utilizing a preferred embodiment of the present invention will be presented. For both simulations, a sample frequency of 100 Hz is used. The first simulation scenario example considers the case where there is no system uncertainties. For the second scenario example, aforementioned uncertainties as assumed. True initial states are selected to be $x_0 = [1 \; -1]^T$ and the assumed initial states are $x_{m0} = 0_{2\times 1}$.

A. Simulation I

For the first simulation example, a scenario is presented where there are no model uncertainties and external disturbances, i.e., $A = A_m$, $C = C_m$ and $w(k) = 0$. For the first simulation, the state estimation error obtained using the traditional Kalman filter is given in FIG. 4A and the estimation error obtained from the proposed robust Kalman filter is presented in FIG. 4B. FIG. 5 shows the estimation error norm obtained for both estimators. Results shown in FIGS. 4A, 4B and 5 indicate that the performance of the proposed robust estimator is similar to that of the Kalman filter when there are no system uncertainties.

B. Simulation II

The uncertain system is considered for the second simulation example. FIG. 4 contains the model-error vector, $\Gamma(k)$, corresponding to the aforementioned uncertainties. The state estimation error obtained using the traditional Kalman filter is given in FIG. 7A and the estimation error obtained from the robust Kalman filter is presented in FIG. 7B. FIG. 8 shows the estimation error norm obtained for both estimators. Results shown in FIGS. 7 and 8 indicate that the performance of the preferred embodiment robust Kalman filter is superior to that of the traditional Kalman filter when there are system uncertainties. Finally it is noted that the performance of the preferred embodiment robust estimator given in FIGS. 7B and 8B are similar to the ones given in FIGS. 4B and 5B.

The formulation of a robust estimator for uncertain stochastic systems under persistent excitation. The preferred embodiment robust estimator guarantees the asymptotic convergence of the state estimation error. Simulation results given in the foregoing indicate that the performance of the proposed robust estimator is similar to that of the traditional Kalman filter when there are no system uncertainties and excitations. As shown by the numerical simulation results, the approach asymptotically recovers the desired optimal performance in the presence of system uncertainties and persistent excitation.

As used herein, the terminology Kalman filter, as defined in Wikipedia, also known as linear quadratic estimation (LQE), refers to an algorithm that uses a series of measurements observed over time, containing noise (random variations) and other inaccuracies, and produces estimates of unknown variables that tend to be more precise than those based on a single measurement alone. More formally, the Kalman filter operates recursively on streams of noisy input data to produce a statistically optimal estimate of the underlying system state. The filter is named for Rudolf (Rudy) E. Kálmán, one of the primary developers of its theory.

The preferred embodiment has applications in technology, such as for autonomous navigation systems, satellite/GPS navigation systems, guidance, control, and maintenance of vehicles, particularly aircraft and spacecraft; and may be applied in time series analysis; a mathematical technique widely used in control systems and avionics to extract a signal from a series of incomplete and noisy measurements. Other applications include orbit determination, radar tracker (tracking), satellite navigation systems, tracking of objects in computer vision, Navigation system, Structural health monitoring, dynamic positioning, speech enhancement, etc.

The invented algorithm overcomes the primary limitation of the traditional Kalman filter which assumes a use within a linear system.

The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state; no additional past information is required.

As used herein the terminology T when associated with a matrix is the transpose.

As used herein the hat, circumflex, or a caret-shaped symbol placed on top of variables gives the meaning of an estimator (e.g., to denote an estimator).

As used herein the ~ on top of a variable refers the assumed variable.

As used herein the m subscript refers to the model.

As used herein the symbol SS means steady-state.

As used herein the terminology standard error of the mean (SEM) is the standard deviation of the sample-mean's estimate of a population mean.

As used herein the terminology "mean estimation error" means the arithmetic mean of the estimation error.

As used herein the arithmetic mean is equal to the sum of the values divided by the number of values. The arithmetic mean of a set of numbers $u_1, u_2, \ldots, u_n$ is denoted by $\bar{u}$, pronounced "u bar".

As used herein $\Re^{m \times m}$ means a matrix of the size m by m of random variables.

As used herein the terminology "processor" means one or more processing units, central processing unit(s), CPU, processor cores, microprocessors, digital signal processors, multiprocessor(s), computer(s), and/or controller(s) which may be connected together or to other circuitry in a manner known to those of ordinary skill in the art.

As used in the specification and claims, the term "target" means object, person or persons, aircraft, vehicle or vehicles and the like.

Obviously, many modifications and variations of the present invention are possible in light of the above teachings. It is therefore to be understood that, within the scope of the appended claims, the invention many be practiced otherwise than as specifically described.

What is claimed is:

1. A computer implemented method for estimation of a system having state variables representing the state of the system comprising:
   predicting the estimate of the state variables along with the uncertainties in the state variables;
   observing a measurement of at least one state variable corrupted with some amount of error;
   updating the estimates of the state variables using a weighted average, with more weight being given to estimates with higher certainty; and
   providing an estimator input to update the estimates of the state variables, the estimator input operating to provide asymptotic convergence of the mean estimation error in all of the state variables in the presence of persistent excitation or disturbance that is not asymptotically decaying to zero;
   wherein the system being estimated is used for time series analysis for signal processing and wherein the system is defined by a process model, and the process model dynamics defining the state variables are unknown and wherein the system is defined by a process model that may be represented as $$x(k+1)=Ax(k)+w(k)+\omega(k)$$

where k represents, time, x is the state vector comprising the unknown state variables, A represents the system matrix comprising unknown elements, w(k) is unknown persistent excitation, $\omega(k)$ is the n dimensional Gaussian white noise process, and wherein the measurement or output may be represented by vector y(k) where $$y(k)=Cx(k)+v(k)$$

where C is the unknown output matrix, and v(k) is the n-dimensional Gaussian white noise process.

2. The method of claim 1 wherein the estimator input may be represented by the vector $\eta(k+1)$ defined as $$\eta(k+1)=\chi^{-1}\Lambda(I-HK)\tilde{y}(k+1)$$

where k represents time, K is the Kalman gain, where $\tilde{y}(k+1)$ is defined as $$\tilde{y}(k+1)|=[y(k+1)-HF\hat{z}(k)],$$

where y(k)=Cx(k)+v(k) where C is the output matrix, $C_m$ is the assumed output matrix, $\Delta C=\{C-C_m\}$ and v(k) is the n-dimensional Gaussian white noise process, where F and G are defined as $$F \triangleq \begin{bmatrix} A_m & 0 \\ 0 & -\frac{1}{2}I_{m \times m} \end{bmatrix}, G = \begin{bmatrix} I_{n \times n} \\ \Delta C \end{bmatrix},$$

where $A_m$ is the assumed state matrix model, where H is the extended output matrix defined as $$H \triangleq [C_m \ I_{m \times m}],$$

where $C_m$ is the assumed output matrix model, $I_{m \times m}$ is an identity matrix of size m by m where m is the number of uncertain measurements or variables, where z(k) is defined as the extended model of x and n combined such that $z(k)=[X^T(k)n^T(k)]$, and where ω(k) is the N-dimensional Gaussian white noise process, and where χ and Λ are obtained by simultaneously solving a linear matrix inequality which may be represented as $$F^T[I-K_{ss}H]^T\chi[I-K_{ss}H]F+S-\chi \leq 0 \quad \chi=H^T\Lambda^T$$

where S is a positive definite matrix design value, where $K_{ss}$ is the steady state Kalman gain.

3. A computer implemented method for estimation of a system having state variables representing the state of the system comprising:
   predicting the estimate of the state variables along with the uncertainties in the state variables;
   observing a measurement of at least one state variable corrupted with some amount of error;
   updating the estimates of the state variables using a weighted average, with more weight being given to estimates with higher certainty; and
   providing an estimator input to update the estimates of the state variables, the estimator input operating to provide asymptotic convergence of the mean estimation error in all of the state variables in the presence of persistent excitation or disturbance that is not asymptotically decaying to zero;
   wherein the system is used for signal processing and wherein the estimator error E is limited such that $$\lim_{k \to \infty} E[z(k) - \hat{z}(k)] = 0$$

where k represents time, x is the state vector comprising the unknown state variables, and z is a vector extension of x such that $$z(k+1) = \begin{bmatrix} x(k+1) \\ n(k+1) \end{bmatrix}.$$

where $n(k)=\{C-C_m\}x(k)$, where C is the output matrix and $C_m$ is the model output matrix.

4. A computer implemented method for estimation of a system having state variables representing the state of the system comprising:
   predicting the estimate of the state variables along with the uncertainties in the state variables;
   observing a measurement of at least one state variable corrupted with some amount of error;
   updating the estimates of the state variables using a weighted average, with more weight being given to estimates with higher certainty; and
   providing an estimator input to update the estimates of the state variables, the estimator input operating to provide asymptotic convergence of the mean estimation error in all of the state variables in the presence of persistent excitation or disturbance that is not asymptotically decaying to zero;
   wherein the system tracks a target and wherein the system is a linear time-invariant stochastic system that may be represented by the following equation:

$$x(k+1)=Ax(k)+w(k)+\omega(k)$$

where $x(k) \in \mathfrak{R}^n$ is the state vector, $w(k) \in \mathfrak{R}^n$ is the unknown persistent excitation, ω(k) is the n-dimensional Gaussian white noise process, and $\omega(k) \sim \mathcal{N}(0, \mathcal{Q})$, $\mathcal{Q}$ is the known noise covariance, $\mathcal{Q} \in \mathfrak{R}^{n \times n}$ is the process noise covariance, and the elements of the system matrix $A \in \mathfrak{R}^{n \times n}$ are unknown, and the target model is measurement equation is given as $$y|(k)=Cx(k)+v(k)$$

where $y(k) \in \mathfrak{R}^m$ is the output vector and v(k) is the n dimensional Gaussian white noise process, such that $v(k) \sim \mathcal{N}(0, R)$ where the output matrix $C \in \mathfrak{R}^{m \times n}$ is assumed to be known and the measurement covariance $R \in \mathfrak{R}^{m \times m}$ is assumed to be known.

5. The method of claim 4, further comprising:
   providing an assumed process model which may be represented by $$x_m(k+1)=A_m x_m(k)+\overline{\omega}(k)$$

where $\overline{\omega}(k)$ is the zero mean Gaussian process noise with known covariance;
   providing an assumed measurement model which may be represented by $$y_m(k)=C_m x_m(k)+v(k);$$

providing model error vectors which may be represented by n(k) and m(k) where $$m(k)=\{A-A_m\}x(k)+w(k)$$

$$n(k)=\{C-C_m\}x(k),$$

and
   providing extended dynamics which may be represented by $$\begin{bmatrix} x(k+1) \\ n(k+1) \end{bmatrix} = \begin{bmatrix} A_m & 0 \\ 0 & -\frac{1}{2}I_{m \times m} \end{bmatrix} \begin{bmatrix} x(k) \\ n(k) \end{bmatrix} + \begin{bmatrix} m(k) \\ u(k) \end{bmatrix} + \begin{bmatrix} I_{n \times n} \\ \Delta C \end{bmatrix} \omega(k)$$

where
$\Delta C \triangleq \{C-C_m\}$
$I_{n \times n} \triangleq$ an identity matrix of dimension n×n
$u(k) \triangleq \{C-C_m\}\{[A_m + \frac{1}{2}I_{n \times n}]x(k)+m(k)\}$.

6. The method of claim 5 further comprising providing extended process dynamics in matrix notation which may be represented by $$z(k+1)=Fz(k)+\Gamma(k)+G\omega(k)$$

where $$z(k) \triangleq [x^T(k) \quad n^T(k)]^T$$

$$F \triangleq \begin{bmatrix} A_m & 0 \\ 0 & -\frac{1}{2}I_{m \times m} \end{bmatrix}$$

$$r(k) \triangleq [m^T(k) \quad u^T(k)]^T$$

$$G \triangleq \begin{bmatrix} I_{n \times n} \\ \Delta C \end{bmatrix}.$$

7. The method of claim 6 further comprising providing an extended measurement process in matrix notation which may be represented by $$y(k)=Hz(k)+v(k)$$

where $H \triangleq [C_m \quad I_{m \times m}]$.

8. The method of claim 7 further comprising providing an extended target or process model which may be represented by $$z_m(k+1)=Fz_m(k)+G_m\overline{\omega}(k) \qquad 5$$

where $$G_m \triangleq \begin{bmatrix} I_{n\times n} \\ O_{m\times n} \end{bmatrix}.$$

9. The method of claim 8 further comprising solving the algebraic matrix Riccati equation which may be represented by $$P_{ss}=FP_{ss}F^T-FP_{ss}H^T[HP_{ss}H^T+R]^{-1}HP_{ss}F^T+G_mQG_m^T$$

$$K_{ss}=P_{ss}H^T(HP_{ss}H^T+R)^{-1}.$$

10. The method of claim 9 further comprising solving a linear matrix inequality for •χ and Λ for any S>0

$$\begin{bmatrix} (F^T[1-K_{ss}H]^T X \times [I-K_{ss}H]F+S-X) & X-H^T\Lambda^T \\ X^T-\Lambda H & 0_{(n+m)\times(n+m)} \end{bmatrix} \leq 0$$

wherein $K_{ss}$ is the steady state Kalman gain.

11. The method of claim 10 further comprising calculating an estimator input which may be represented by $$\eta(k+1)=\chi^{-1}\Lambda(I-HK)\tilde{y}(k+1)$$

and providing an estimator or tracker $$\hat{z}(k+1)=F\hat{z}(k)+K_{ss}[y(k+1)-HF\hat{z}(k)]+\eta(k+1)$$

operatively associated with an estimator error or tracking error guarantee $$\lim_{k\to\infty} E[z(k)-\hat{z}(k)] = 0,$$

wherein the estimator or tracker is utilized for one of tracking vehicles, particularly aircraft and spacecraft, and time series analysis used in fields such as signal processing and econometrics.

12. A device for tracking a stochastic system operating in the presence of persistent excitation or disturbance; the system being represented by state variables representing the state of the system; the device comprising:
an input for inputting a representation of the stochastic system including estimates of state variables and a measurement of at least one state variable corrupted with some amount of error;
at least one processor for predicting the estimates of the state variables along with the uncertainties in the state variables, the at least one processor operating to update the estimates of the state variables using a weighted average, with more weight being given to estimates with higher certainty, and an estimator input, the estimator input operating to provide asymptotic convergence of the mean estimation error in all of the state variables in the presence of persistent excitation or disturbance that is not asymptotically decaying to zero;
wherein the system is for tracking a linear time-invariant stochastic system that may be represented by the following equation:

$$x(k+1)=Ax(k)+w(k)+\omega(k)$$

where $x(k)\in\mathfrak{R}^n$ is the state vector, $w(k)\in\mathfrak{R}^n$ is the unknown persistent excitation, $\omega(k)$ is the n-dimensional Gaussian white noise process, and $\omega(k)\sim\mathcal{N}(0, \mathcal{Q})$, $\mathcal{Q}$ is the known noise covariance, $\mathcal{Q}\in\mathfrak{R}^{n\times n}$ is the process noise covariance, and the elements of the system matrix $A\in\mathfrak{R}^{n\times n}$ are unknown, and the target model is measurement equation is given as $$y|(k)=Cx(k)+v(k)$$

where $y(k)\in\mathfrak{R}^m$ is the output vector and $v(k)$ is the n dimensional Gaussian white noise process, such that $v(k)\sim\mathcal{N}(0, R)$ where the output matrix $C\in\mathfrak{R}^{m\times n}$ is assumed to be known and the measurement covariance $R\in\mathfrak{R}^{m\times m}$ is assumed to be known.

13. The device of claim 12 wherein the at least one processor operates to
provide a process model which may be represented by $$x_m(k+1)=A_m x_m(k)+\overline{\omega}(k)$$

where $\overline{\omega}(k)$ is the zero mean Gaussian process noise with known covariance, provide a measurement process which may be represented by $$y(k)=Cx(k)+v(k)$$

where $y(k)$ is an m-dimensional vector representing the measurements, $v(k)$ represents zero mean Gaussian measurement noise with a known covariance, provide a measurement model which may be represented by $$y_m(k)=C_m x_m(k)+v(k),$$

provide model error vectors which may be represented by $n(k)$ and $m(k)$ where $$m(k)=\{A-A_m\}x(k)+w(k)$$

$$n(k)=\{C-C_m\}x(k),$$

provide extended dynamics which may be represented by $$\begin{bmatrix} x(k+1) \\ n(k+1) \end{bmatrix} = \begin{bmatrix} A_m & 0 \\ 0 & -\frac{1}{2}I_{m\times m} \end{bmatrix}\begin{bmatrix} x(k) \\ n(k) \end{bmatrix} + \begin{bmatrix} m(k) \\ u(k) \end{bmatrix} + \begin{bmatrix} I_{n\times n} \\ \Delta C \end{bmatrix}\omega(k)$$

where
$\Delta C \triangleq \{C-C_m\}$
$I_{n\times n} \triangleq$ an identity matrix of dimension n×n
$u(k) \triangleq \{C-C_m\}\{[A_m+\frac{1}{2}I_{n\times n}]x(k)+m(k)\},$
provide extended process dynamics in matrix notation which may be represented by $$z(k+1)=Fz(k)+\Gamma(k)+G\omega(k)$$

where $$z(k) \triangleq [x^T(k) \ n^T(k)]^T$$

$$F \triangleq \begin{bmatrix} A_m & 0 \\ 0 & -\frac{1}{2}I_{m \times m} \end{bmatrix}$$

$$r(k) \triangleq [m^T(k) \ u^T(k)]^T$$

$$G \triangleq \begin{bmatrix} I_{n \times n} \\ \Delta C \end{bmatrix},$$

provide an extended measurement process in matrix notation which may be represented by $$y(k) = Hz(k) + v(k)$$

where $H \triangleq [C_m \ I_{m \times m}]$,
providing an extended target or process model which may be represented by $$z_m(k+1) = Fz_m(k) + G_m\overline{\omega}(k)$$

where $$G_m \triangleq \begin{bmatrix} I_{n \times n} \\ O_{m \times n} \end{bmatrix},$$

solve the algebraic matrix Riccati equation which may be represented by $$P_{ss} = FP_{ss}F^T - FP_{ss}H^T[HP_{ss}H^T+R]^{-1}HP_{ss}F^T + G_mQG_m^T$$

$$K_{ss} = P_{ss}H^T(HP_{ss}H^T+R)^{-1}$$

solve a linear matrix inequality for $\cdot \chi$ and $\Lambda$ for any $S > 0$ $$\begin{bmatrix} (F^T[I-K_{ss}H]^T\chi \times [I-K_{ss}H]F + S - \chi) & x - H^T\Lambda^T \\ \chi^T - \Lambda H & 0_{(n+m) \times (n+m)} \end{bmatrix} \leq 0$$

wherein $K_{ss}$ is the steady state Kalman gain,
calculate an estimator input which may be represented by $$\eta(k+1) = \chi^{-1}\Lambda(I-HK)\tilde{y}(k+1),$$

and
provide an estimator or tracker $$\hat{z}(k+1) = F\hat{z}(k) + K_{ss}[y(k+1) - HF\hat{z}(k)] + \eta(k+1)$$

operatively associated with an estimator error or tracking error guarantee $$\lim_{k \to \infty} E[z(k) - \hat{z}(k)] = 0.$$

* * * * *